(12) United States Patent
Bianco et al.

(10) Patent No.: US 9,886,679 B2
(45) Date of Patent: Feb. 6, 2018

(54) CONNECTION LINE PROTECTION SYSTEM

(71) Applicants: James S. Bianco, Suffield, CT (US); John Fahy, Longmeadow, MA (US)

(72) Inventors: James S. Bianco, Suffield, CT (US); John Fahy, Longmeadow, MA (US)

(73) Assignee: Control Module, Inc., Enfield, CT (US)

( * ) Notice: Subject to any disclaimer, the term of this patent is extended or adjusted under 35 U.S.C. 154(b) by 134 days.

(21) Appl. No.: 14/513,391

(22) Filed: Oct. 14, 2014

(65) Prior Publication Data
US 2015/0186837 A1 Jul. 2, 2015

Related U.S. Application Data

(60) Provisional application No. 61/890,632, filed on Oct. 14, 2013.

(51) Int. Cl.
*G06Q 10/08* (2012.01)
*B60P 3/22* (2006.01)
*B67D 7/34* (2010.01)

(52) U.S. Cl.
CPC ............ *G06Q 10/087* (2013.01); *B60P 3/225* (2013.01); *B60P 3/2245* (2013.01); *B67D 7/348* (2013.01)

(58) Field of Classification Search
CPC .. F02C 7/232; F02C 7/236; F02C 9/38; F02C 9/26; G06Q 10/087; B60P 3/225; B60P 3/2245; B67D 7/348
See application file for complete search history.

(56) References Cited

U.S. PATENT DOCUMENTS

| | | | | |
|---|---|---|---|---|
| 6,047,250 A * | 4/2000 | Beaudoin | ............... | G01F 1/065 455/517 |
| 6,213,401 B1 * | 4/2001 | Brown | ............. | G08G 1/096716 235/486 |
| 2006/0006228 A1 * | 1/2006 | Poulter | .................. | B67D 7/348 235/381 |
| 2011/0197988 A1 * | 8/2011 | Van Vliet | ................ | B67D 7/04 141/1 |
| 2012/0211974 A1 * | 8/2012 | Richardson | ............ | A62C 33/00 285/93 |

* cited by examiner

*Primary Examiner* — Sonji Johnson
(74) *Attorney, Agent, or Firm* — Alix, Yale & Ristas, LLP

(57) ABSTRACT

A connection line protection system employs unique identifiers on outlets and inlets. A connector connects a selected outlet with a selected inlet. The connector mounts at opposing ends an identifier that identifies the connector. A scanner is employed to scan in tandem a first identifier of the outlet and a connector identifier and a second identifier of the inlets and the identifier of the connector. The readings are compared with a schedule to determine whether the connector is properly mounted and connected between a selected outlet and a selected inlet. The identifiers include RFIDs and barcodes. The identifiers are preferably angularly spaced around the outlets, inlets and the couplers of the connector. The identifier may be affixed by snap rings mounting barcode labels or RFID buttons.

18 Claims, 24 Drawing Sheets

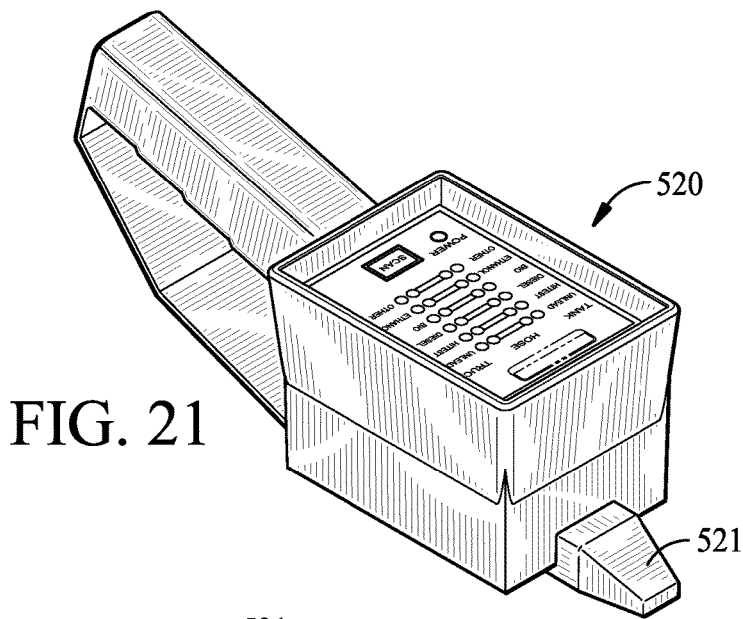
FIG. 21
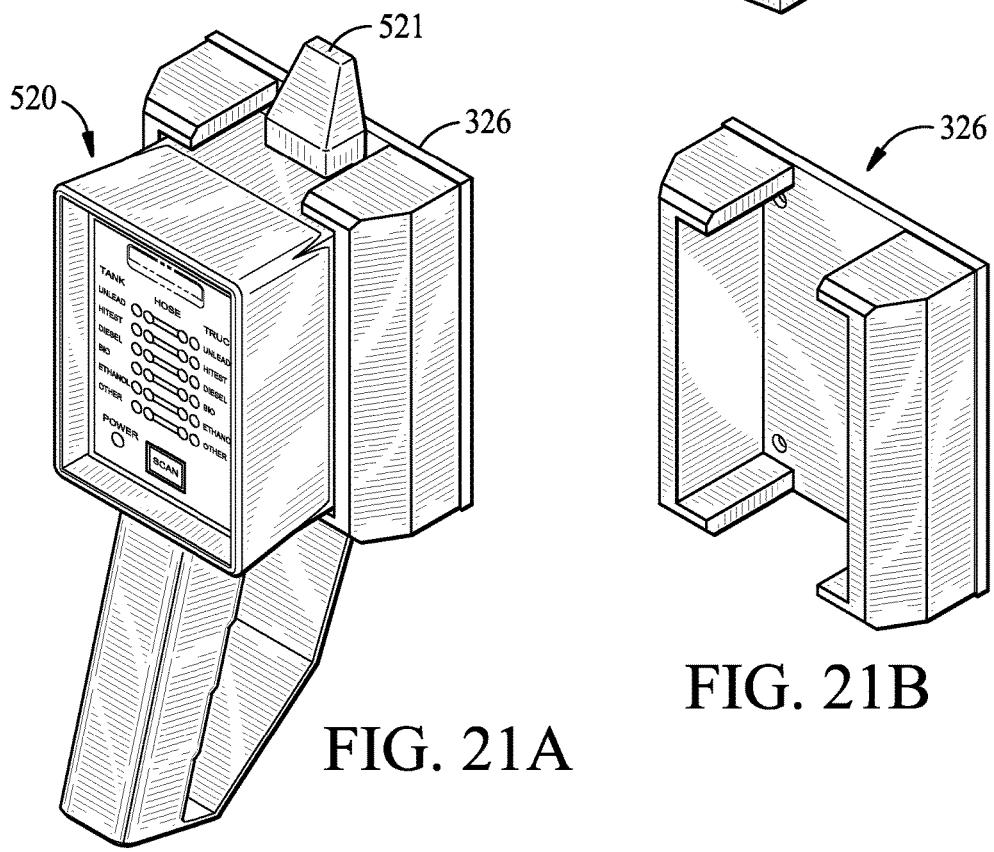
FIG. 21A
FIG. 21B

1

CONNECTION LINE PROTECTION SYSTEM

BACKGROUND

In the liquid distribution industry, such as bottling and canning operations and liquid fuel deliveries, such as oil and gasoline, it is necessary to use temporary hose connections between the tanks storing the liquid and bottling equipment or tanks receiving the liquid. It is possible, if the operator is not careful, to introduce the wrong liquid into the wrong production line or storage tank because multiple hoses can be used simultaneously in large bottling facilities and multiple tanks used on delivery trucks and multiple tanks can be used to store the liquid at the sites. This mix-up could be quite costly and time-consuming to correct the error.

To prevent the mix-up between hoses, tanks, and bottling and canning equipment, it is highly desirable to have an automatic identification system, that will quickly and accurately verify that the interconnect hoses are connected to the correct ports. This disclosure partially pertains to techniques of identifying the hose connections and the ports to which they are attached to. It is very important that the identification is easily achieved, accurate, and cost-effective. Two different methods of identification are employed. The first uses the barcode technology and the second uses RFID technology. Both systems use a portable scanner, with wireless communications back to a central processor that either verifies the hose connections are correct or alerts the operator if there is an incorrect connection.

SUMMARY

Briefly stated, the connection line protection system comprises a first array of outlets that each have a first unique identifier and a second array of inlets that each have a second unique identifier. The connection line protection system also comprises a connector having opposed ends that each have a connector identifier and a scanner for reading in tandem a first identifier and a connector identifier and a second identifier and a connector identifier. The scanner compares the readings with a schedule to determine whether the opposed ends of the connector are properly connected between an outlet and an inlet. The identifiers comprise barcodes or RFIDs. The first array of outlets may be manifold ports and the second array of inlets may be inlet ports. The manifold ports are each connected to a storage tank and the connector may be a hose.

The outlets comprise a multiple port fuel manifold each connecting with corresponding fuel tanks of a fuel delivery truck. The inlets communicate with a corresponding storage tank. The connector has opposed couplings each with a ring mounting angularly spaced identifiers. The identifiers comprise a barcode or an RFID. At least two barcodes or RFIDs are disposed at angularly spaced locations around the coupling and rings snap onto the couplings. The outlets further have a plurality of angularly spaced barcodes or RFIDs. The inlets further have a plurality of angularly spaced barcodes or RFIDs.

Briefly stated, the connection line protection method comprises scanning a personal identification badge, associated with an operator, with a scanner and sending the information to a gateway terminal by a radio frequency network. The gateway terminal then sends a schedule to the scanner containing a first identifier of an outlet, a second identifier of an inlet, and a third identifier of a connector. The method then involves connecting the connector to the outlet and inlet and scanning the identifiers at the connections between the outlet and connector and inlet and connector. The connection line protection method then involves comparing the scanned identifiers with the schedule and emitting an audio or visual cue to alert the operator if the scanned identifiers do not match the schedule.

The connection line protection method further comprises scanning the first identifier on the outlet, the second identifier on the inlet, and the third identifier on the connector with the scanner and comparing the scanned identifiers with the schedule. The scanner emits an audio or visual cue to alert the operator if the scanned identifiers do not match the schedule. This method may further comprise collecting identifiers with the terminal to create the schedule. The connection line protection method may also include disposing at least two identifiers at angularly spaced locations around the connector at opposed couplings and snapping rings onto the couplings. At least two identifiers may be disposed at angularly spaced locations around the outlets and/or the inlets. Additionally, the connection line protection method may include storing the schedule in a memory of the scanner and storing the time scanned and the information contained in the personal identification badge in the memory. A location identifier associated with a location, information from the first identifier on the outlet, information from the second identifier on the inlet, and information from the third identifier on the connector may also be stored in the scanner.

BRIEF DESCRIPTION OF THE DRAWINGS

FIG. 21 is a photograph of a handheld RFID scanning terminal;

FIG. 21A is an isometric drawing of the handheld RFID scanning terminal of FIG. 21;

FIG. 21B is an isometric drawing of a charging station for the RFID scanning terminal of FIG. 21;

DETAILED DESCRIPTION

With reference to the drawings, wherein like numerals represent like parts throughout the several figures, a connection line protection system has numerous applications, including the disclosed applications wherein the connection line protection system automatically determines whether a line connection between a port of a manifold of ports and a selected second port for an outlet line is correctly connected or a hose is correctly connected between a fuel tank truck reservoir and the proper underground storage tank, such as employed in fuel dispensing stations. The connection line protection system preferably employs handheld scanners which have RF communication capability and read barcodes or RFID tags to determine whether or not the connections are correct.

Figure 1:
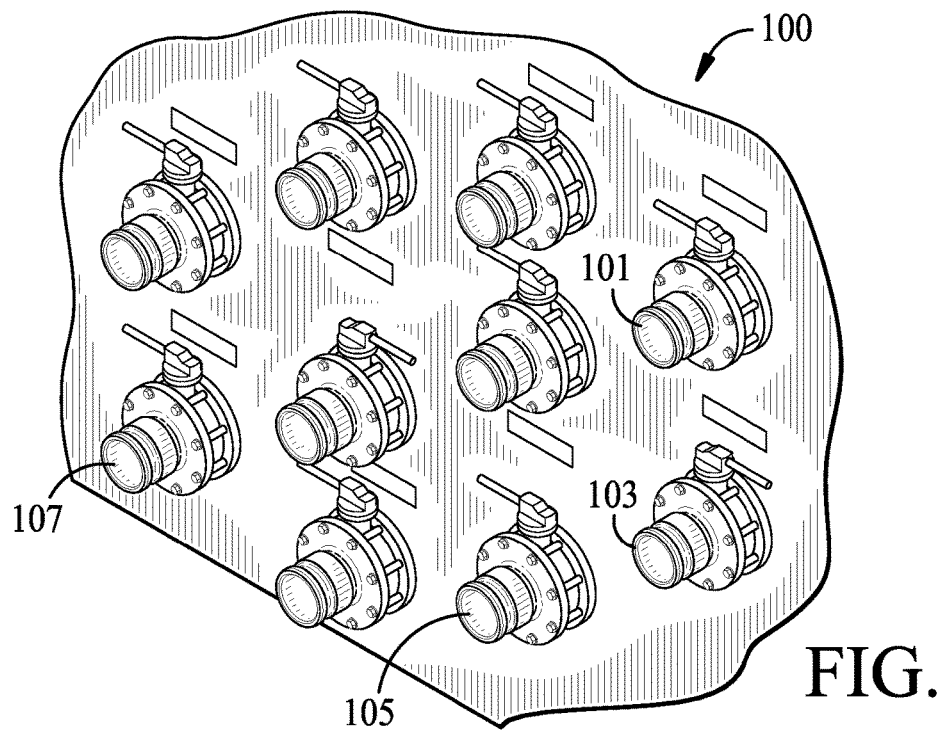
FIG. 1 is a photograph of multiple panel mounted manifold ports.
Figure 2:
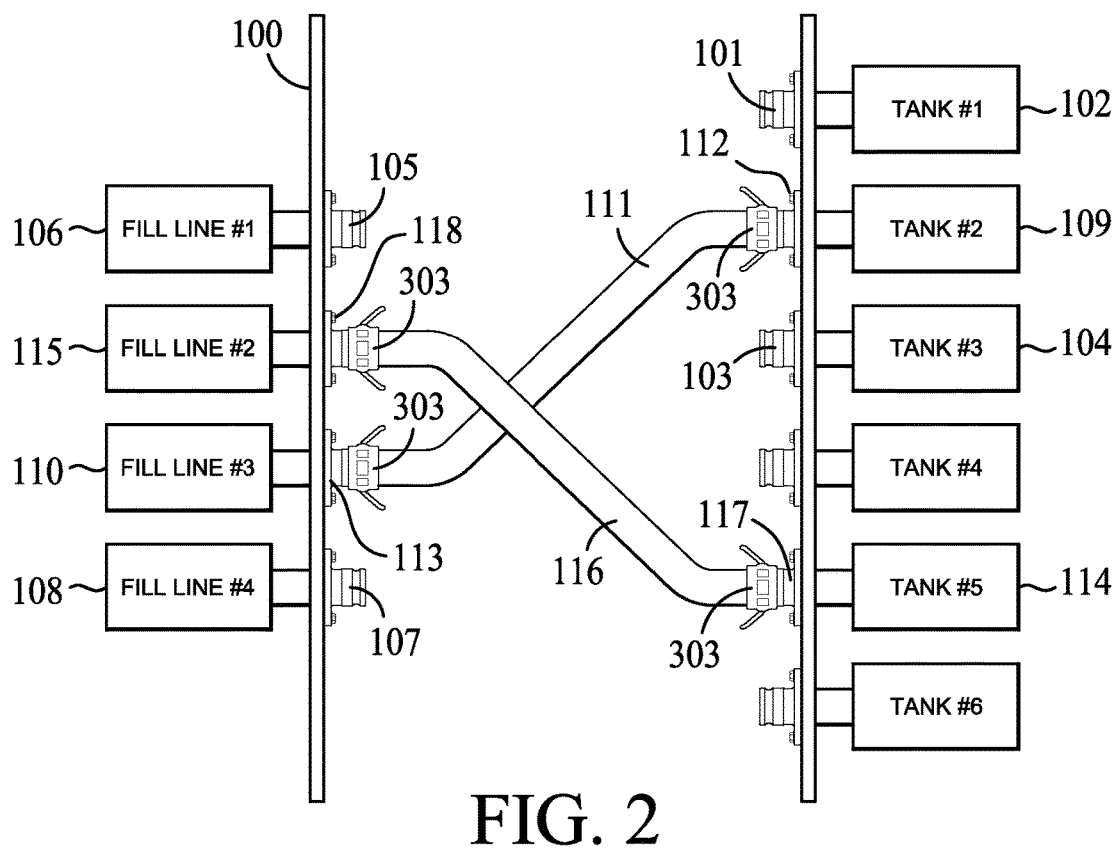
FIG. 2 is a photograph of a representative distribution manifold for storage tanks with selected ports connected to selected fill lines for which the connection line protection system is employed.

The connection line protection system may be employed to ensure proper connections between manifold line ports and fill ports as shown in FIGS. 1 and 2. A representative distribution manifold 100 which shows quick connect storage tank manifold ports 101, 103 and quick connect filler line manifold ports 105, 107. As many as 100 manifold ports may be mounted to a distribution panel 100. Manifold ports 101 are connected to storage tank number one 102, manifold ports 103 are connected to storage tank number three 104, manifold ports 117 are connected to storage tank number five 114, and manifold ports 105 are connected to fill line number one 106, manifold ports 107 are connected to fill line number four 108, manifold ports 113 are connected to fill line number three 110, and manifold ports 118 are connected to fill line number two 115. Also shown are interconnecting hoses 111, 116 with quick connect hose couplings 303.

Figure 3:
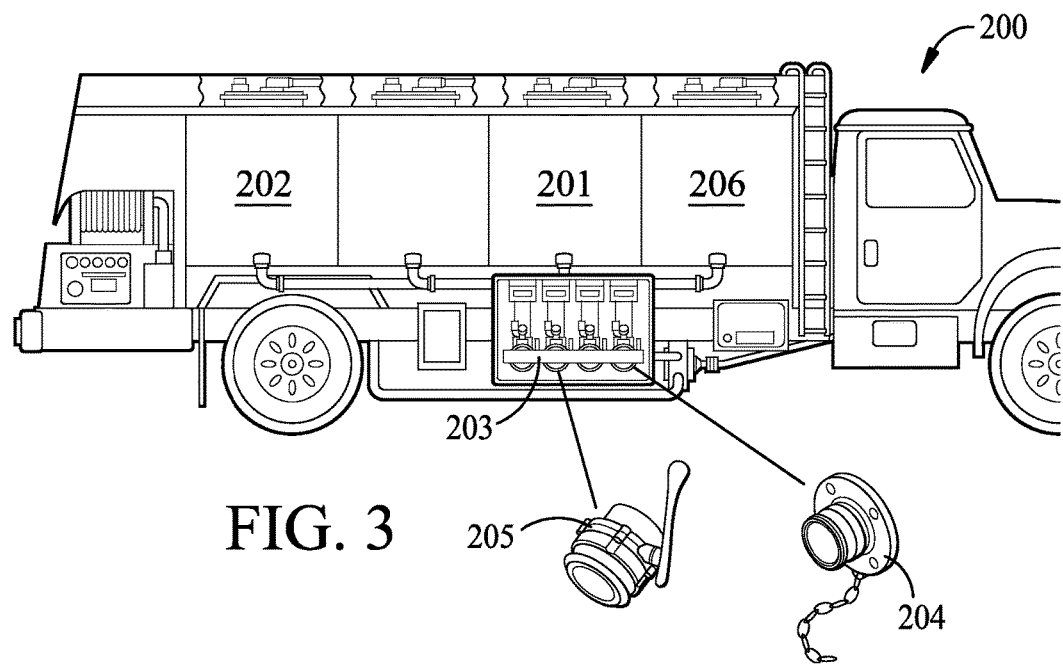
FIG. 3 is a photograph of multiple mounted manifold ports on a tank truck.
Figure 3A:
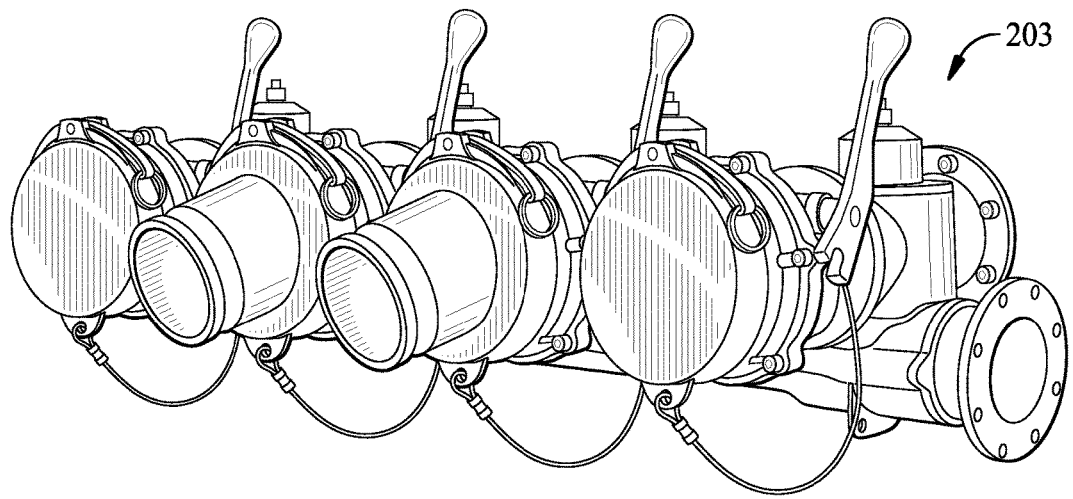
FIG. 3A is an enlarged pictorial drawing of a floor port fuel manifold.
Figure 4:
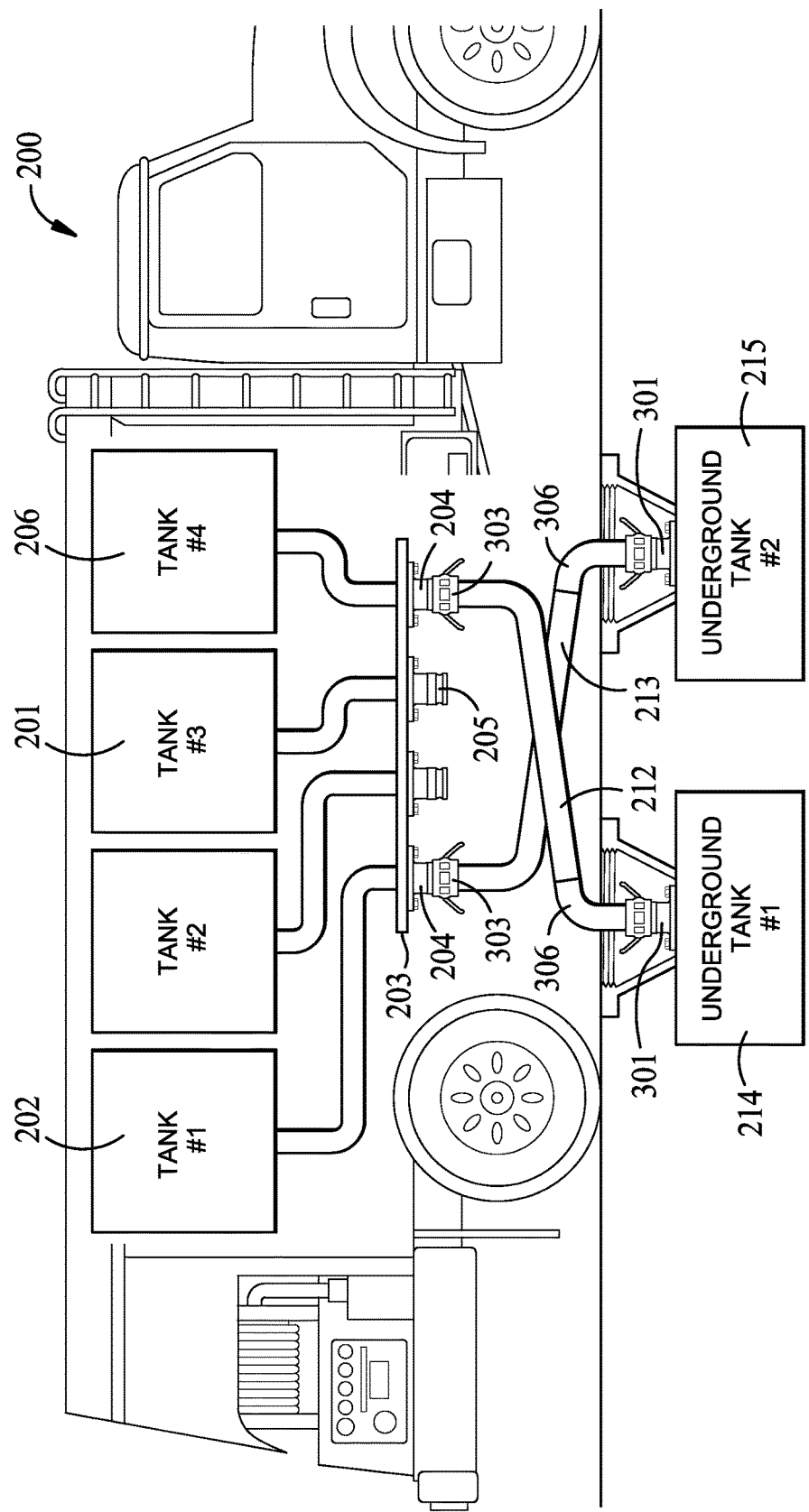
FIG. 4 is a line drawing of the fuel delivery truck as connected to underground storage tanks.

The connection line protection system may also be employed to ensure proper hose connections for the fuel delivery truck/underground tank system of FIGS. 3 and 4. A representative fuel delivery truck 200 with multiple fuel tanks 201, 202, 206 connected to four port fuel manifold 203, which includes a loading component 205 and an unloading coupler 204. A representative fuel delivery truck 200 with multiple fuel tanks 201, 202, 206 connected to four port fuel manifold 203, which includes a loading component 205 connected to truck tank number three 201 and an unloading coupler 204 connected to truck tank number one 202 and unloading coupler 204 connected to truck tank number four 206. Also shown are an interconnecting hose 212, with quick connect hose couplings 303 and right angle quick connect hose coupling 306 connected to underground tank number one 214. Also shown are an interconnecting hose 213 with quick connect hose couplings 303 and right angle quick connect hose coupling 306 connected to underground tank number two 215.

Figure 5:
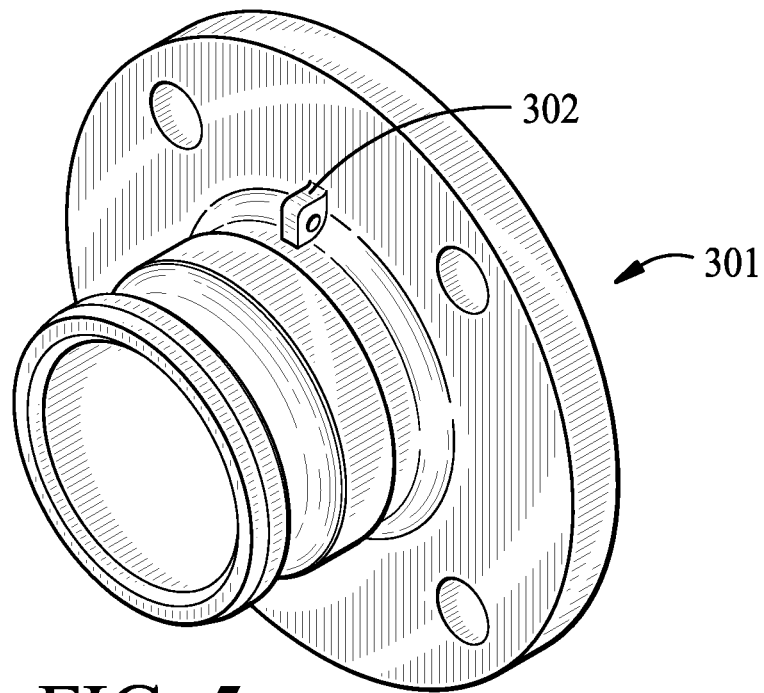
FIG. 5 is a photograph of a quick connect storage tank manifold port.

FIG. 5 is a photograph of quick connect storage tank manifold ports 301 and the cover retaining clip 302.

Figure 6:
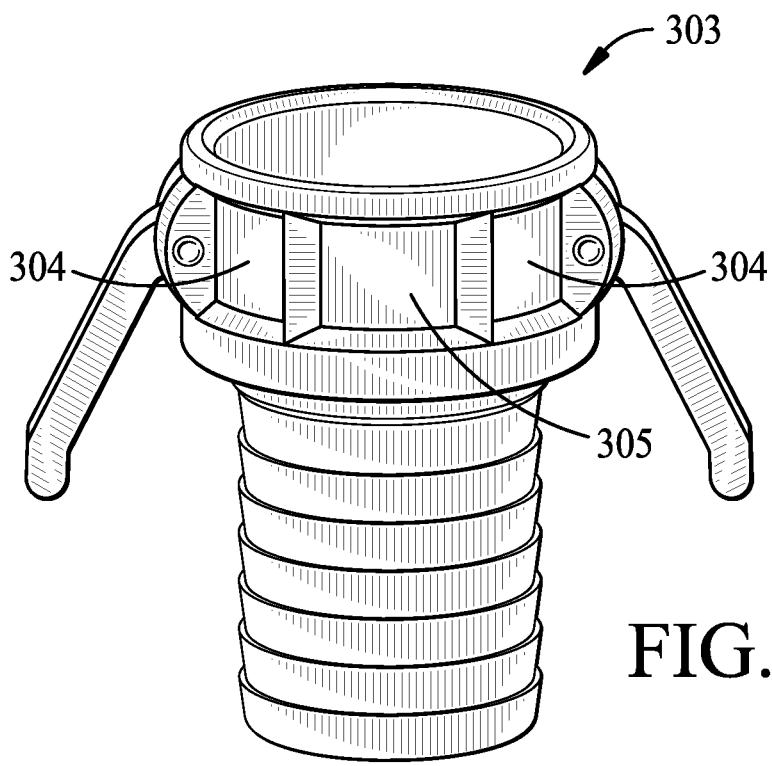
FIG. 6 is a photograph of a quick connect hose coupling.

FIG. 6 is a photograph of a quick connect hose coupling 303, with two recessed areas 304 and one recessed area 305. A second set of recessed areas on the reverse side of the hose coupling 303 are not shown in photograph.

Figure 7:
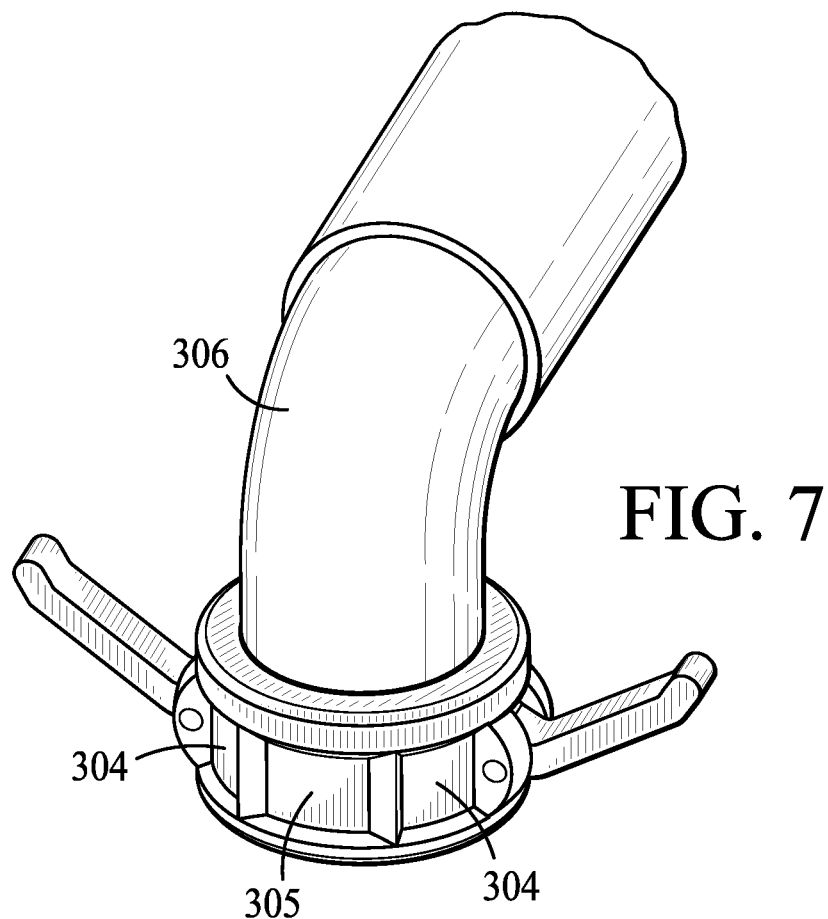
FIG. 7 is a line drawing of right angle quick connect hose coupling.

FIG. 7 shows a right angle quick connect hose coupling 306, with two recessed areas 304 and one recessed area 305. A second set of recessed areas on the reverse side of the hose coupling 306 are not shown in the photograph.

Figure 8:
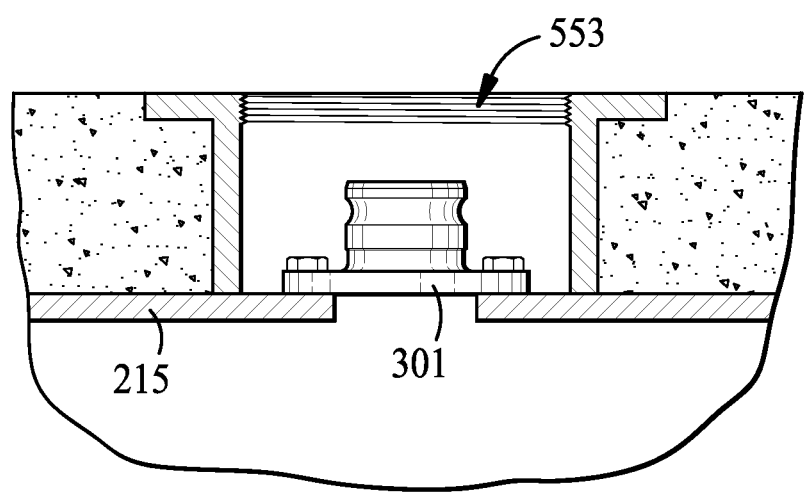
FIG. 8 is a line drawing of a quick connect storage tank manifold port.

FIG. 8 shows a quick connect storage tank manifold port 301, underground storage tank 215 and the cover retaining manhole 553. The cover is not shown.

Figure 9:
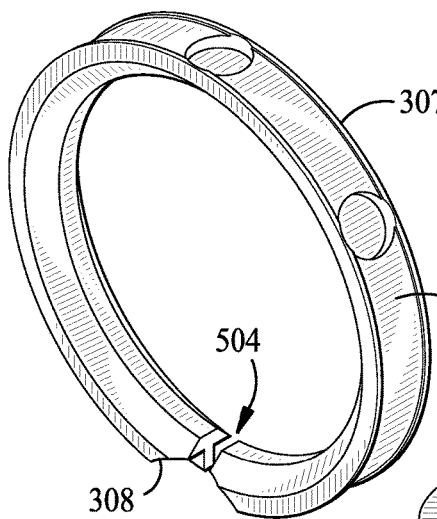
FIG. 9 is an isometric drawing of a snap ring.
Figure 9A:
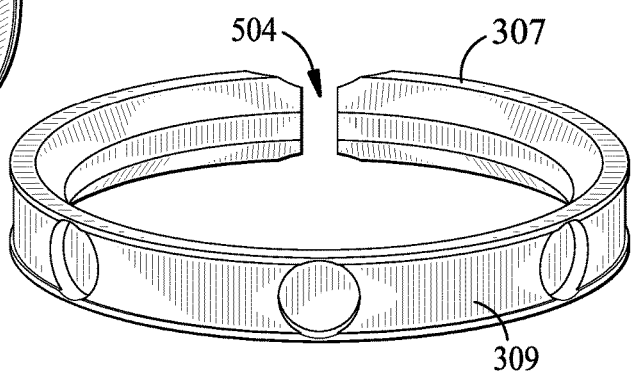
FIG. 9A is a photograph of a snap ring.
Figure 9B:
FIG. 9B is a photograph of a snap ring barcode label.
Figure 9C:
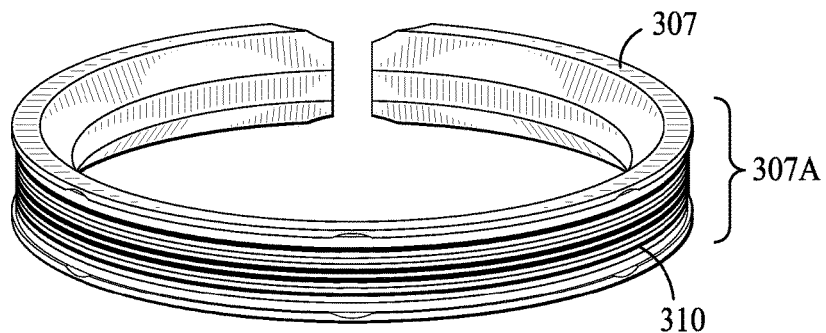
FIG. 9C is a photograph of an intelligent barcode snap ring assembly.
Figure 10:
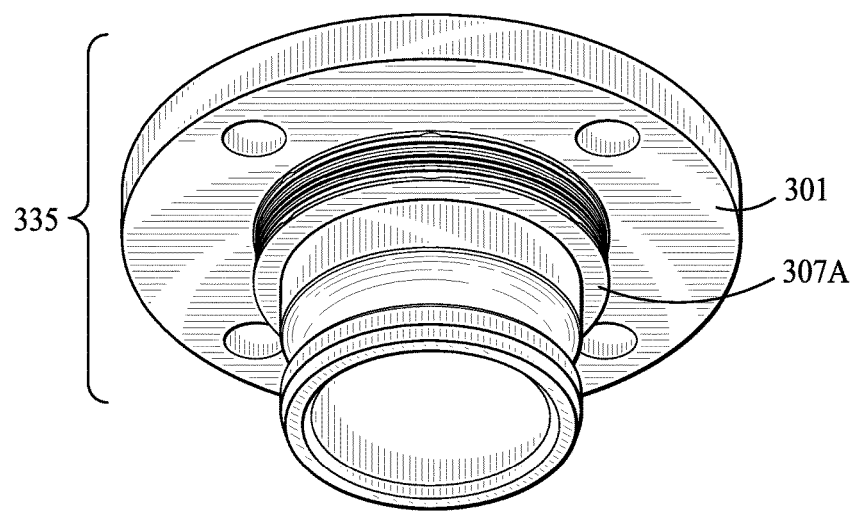
FIG. 10 is a photograph of an intelligent barcode ring attached to a quick connect storage tank manifold port.

Various snap ring features are illustrated in FIG. 9-10. FIG. 9 shows a snap ring 307 with recessed label area 309 and recessed cover retaining clip area 308. FIG. 9A is a photograph of a snap ring 307 with a cut in the ring 504 that allows the snap ring to be expanded. FIG. 9B is a photograph of a snap ring barcode label 310 with bar code label 311 being printed horizontally approximately the full length of the label. FIG. 9C is a photograph of a snap ring 307 and barcode label 310 applied to snap ring 307 to form intelligent barcode snap ring assembly 307A. FIG. 10 is a photograph of intelligent barcode snap ring assembly 307A attached to a quick connect storage tank manifold ports 301, to form an intelligent manifold port assembly 335.

Figure 11:
FIG. 11 is a photograph of hose coupling barcode labels.
Figure 11:
Figure 11:
Figure 11A:
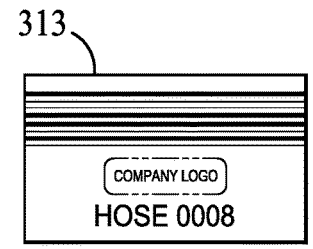
FIG. 11A is an enlarged photograph of a hose coupling barcode label.
Figure 11B:
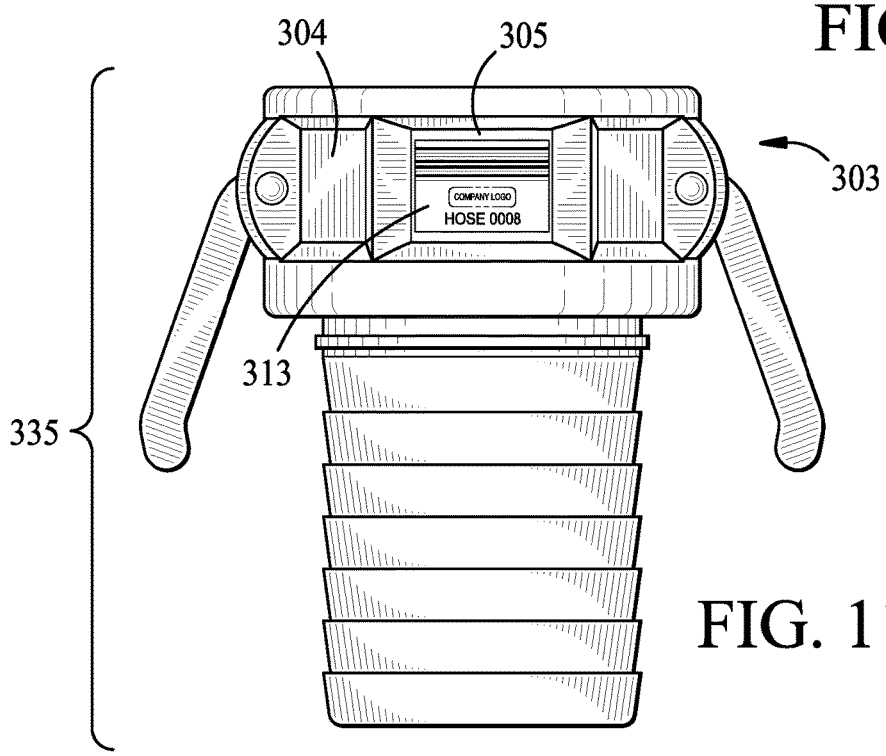
FIG. 11B is a photograph of an intelligent barcode quick connect hose coupling.

FIG. 11 is a photograph of hose coupling barcode labels 312, 313, 314 with the bar code being printed horizontally the full length of the label. FIG. 11A is an enlarged photograph of hose coupling barcode label 313. FIG. 11B is a photograph of hose coupling 303 with barcode label 313 applied to recessed area 304 to form intelligent barcode quick connect hose coupling 336.

Figure 12:
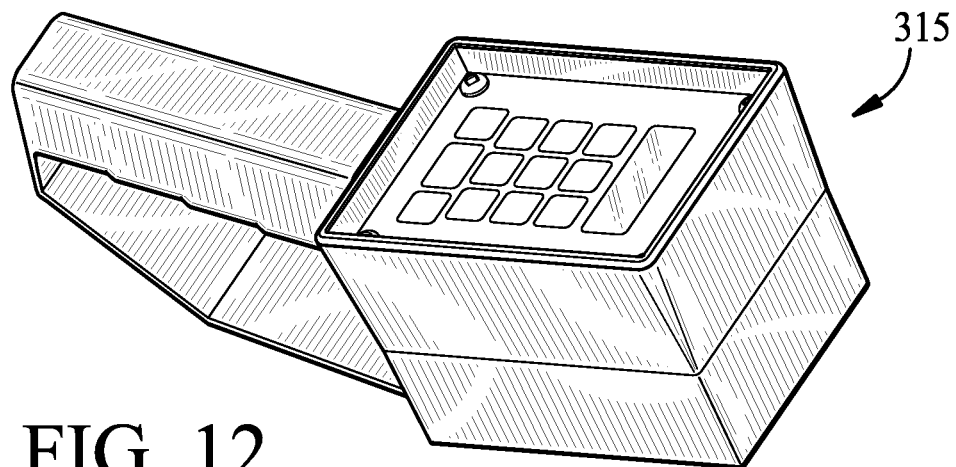
FIG. 12 is a photograph of a handheld barcode scanning terminal.
Figure 12A:
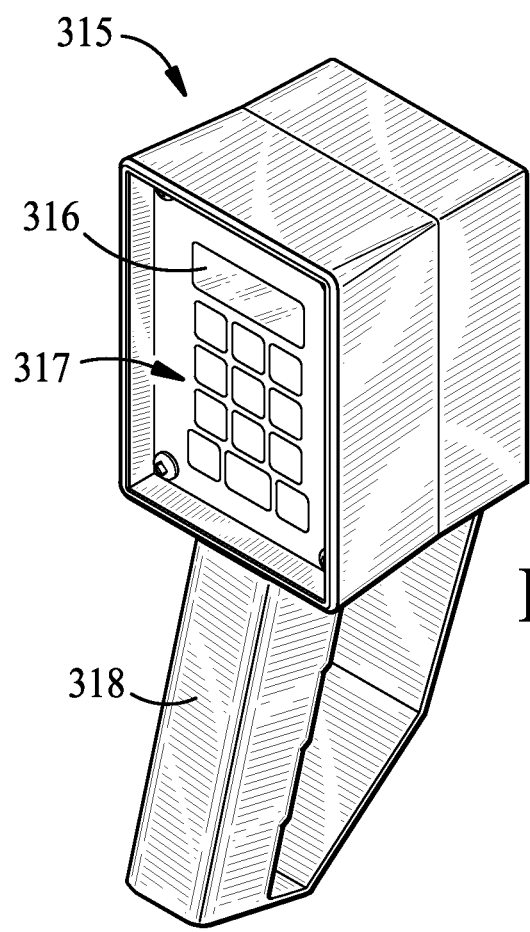
FIG. 12A is a line drawing of the handheld barcode scanning terminal of FIG. 12.
Figure 13:
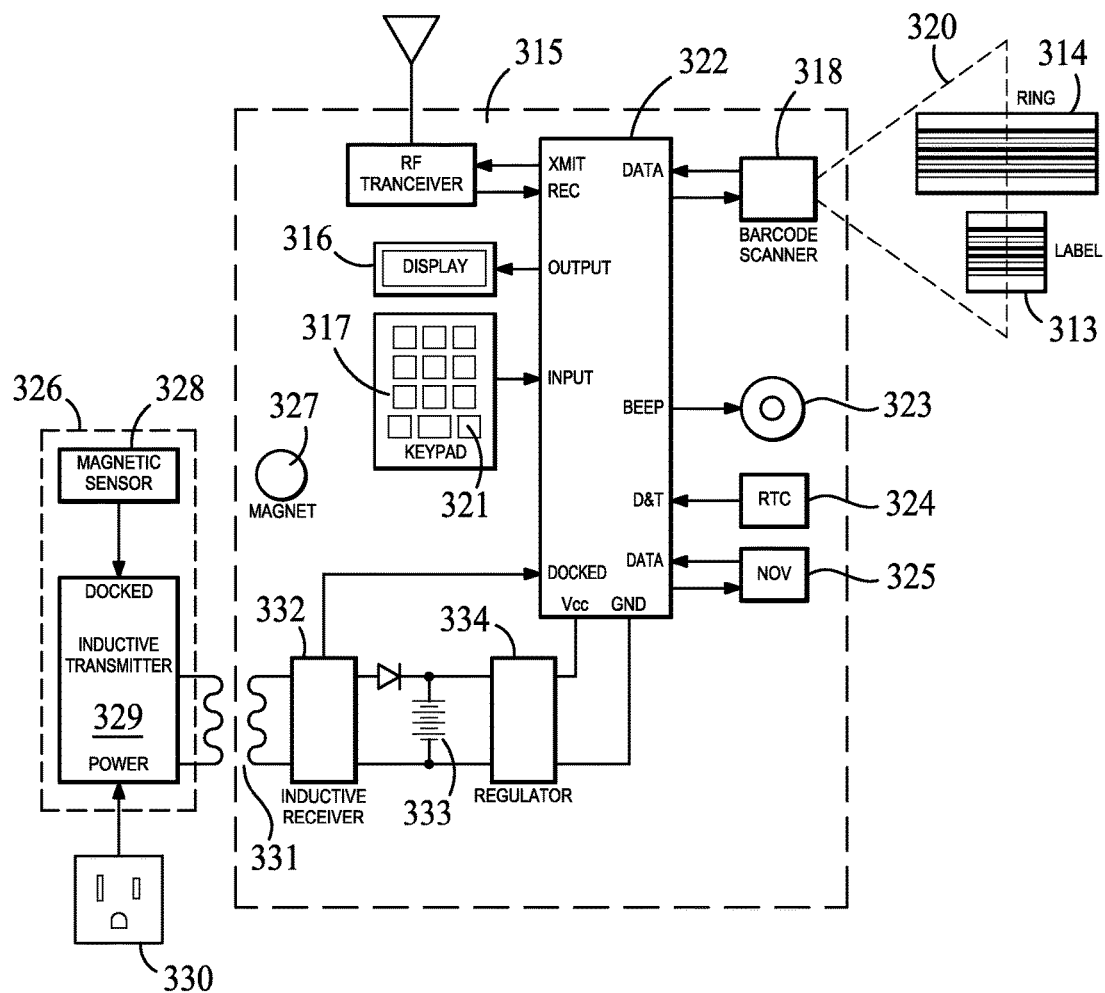
FIG. 13 is a schematic drawing of the handheld barcode scanning terminal of FIG. 12.

With reference to FIGS. 12-13, a handheld barcode scanning terminal with RF communications 315 is preferably employed in the connection line protection system. The handheld barcode scanning terminal with RF communications 315 showing a display 316, a keypad 317, and a terminal handle 318.

FIG. 13 shows a schematic drawing of one embodiment of a handheld barcode scanning terminal with RF communications 315 an intelligent barcode ring 314, an intelligent quick connect hose barcode label 313, a charging cradle 326, and a power module 330.

The barcode scanning terminal 315 contains a microprocessor 322 that receives data from RFID scanner 525 which is transmitted to an RF transceiver and nonvolatile memory 325. The RF transceiver and/or nonvolatile memory 325 transmit data back to the microprocessor 322 and if the data is incorrect the microprocessor sends a signal to audio enunciator 323 to alert the operator. The microprocessor 322 also sends data to display 316 for the operator to read. The microprocessor 322 receives input from the operator through keys 321 on keypad 317.

The microprocessor 322 sends data to a gateway terminal (not pictured) through the RF transceiver. The barcode scanning terminal 315 receives data from the intelligent barcode ring 314 and the intelligent quick connect hose barcode label 313 through barcode scanner 318, which uses scanning beam 320.

The charging cradle 326 is electrically connected to power module 524 and contains magnet sensor 328, inductive transmitter 329, and inductive coils 331. When the magnet sensor 328 senses close proximity of magnet 327 in the barcode scanning terminal 315, the inductive transmitter 329 is switched to an on state to transmit electricity from power module 330 to an inductive receiver 332 in the barcode scanning terminal 315. This electricity is transmitted through inductive coils 331. The microprocessor 322 ultimately receives electricity from terminal battery 333 which is mounted in parallel with inductive receiver 332 and regulator 334.

Figure 14:
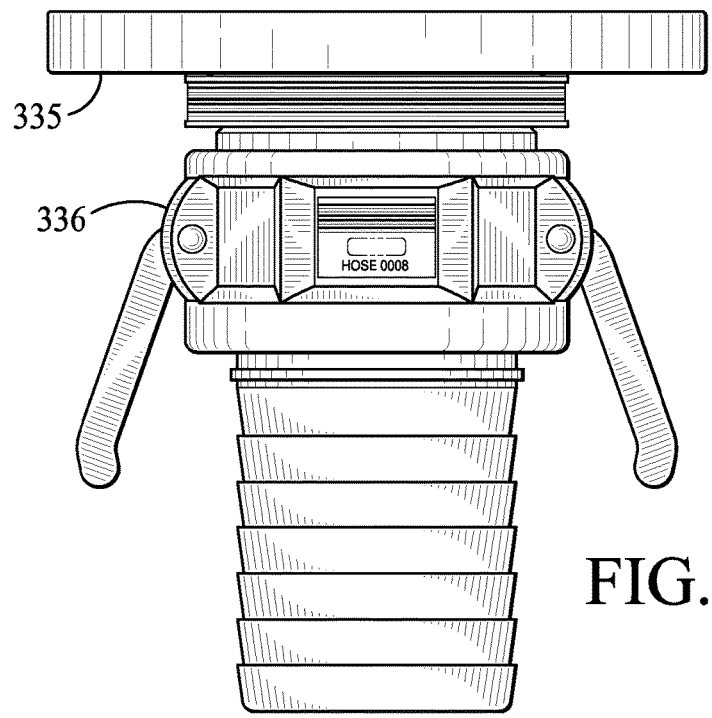
FIG. 14 is a photograph of an intelligent manifold port assembly.

FIG. 14 is a photograph of an intelligent manifold port assembly 335 connected to an intelligent barcode quick connect hose coupling 336.

Figure 15:
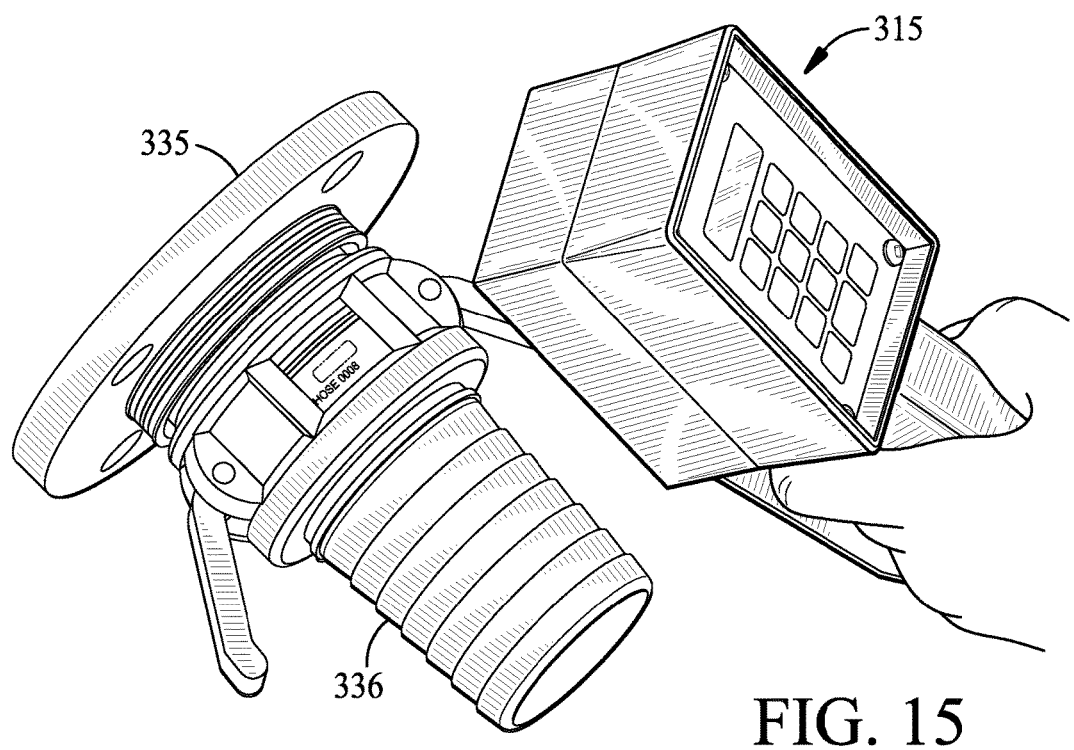
FIG. 15 is a photograph of the handheld barcode scanning terminal of FIG. 12 as employed to scan a manifold port and connected quick collect hose coupling.

FIG. 15 is a photograph of handheld barcode scanning terminal 315 concurrently scanning the labels on an intelligent manifold port assembly 335 and a connected intelligent barcode quick connect hose coupling 336.

Figure 15A:
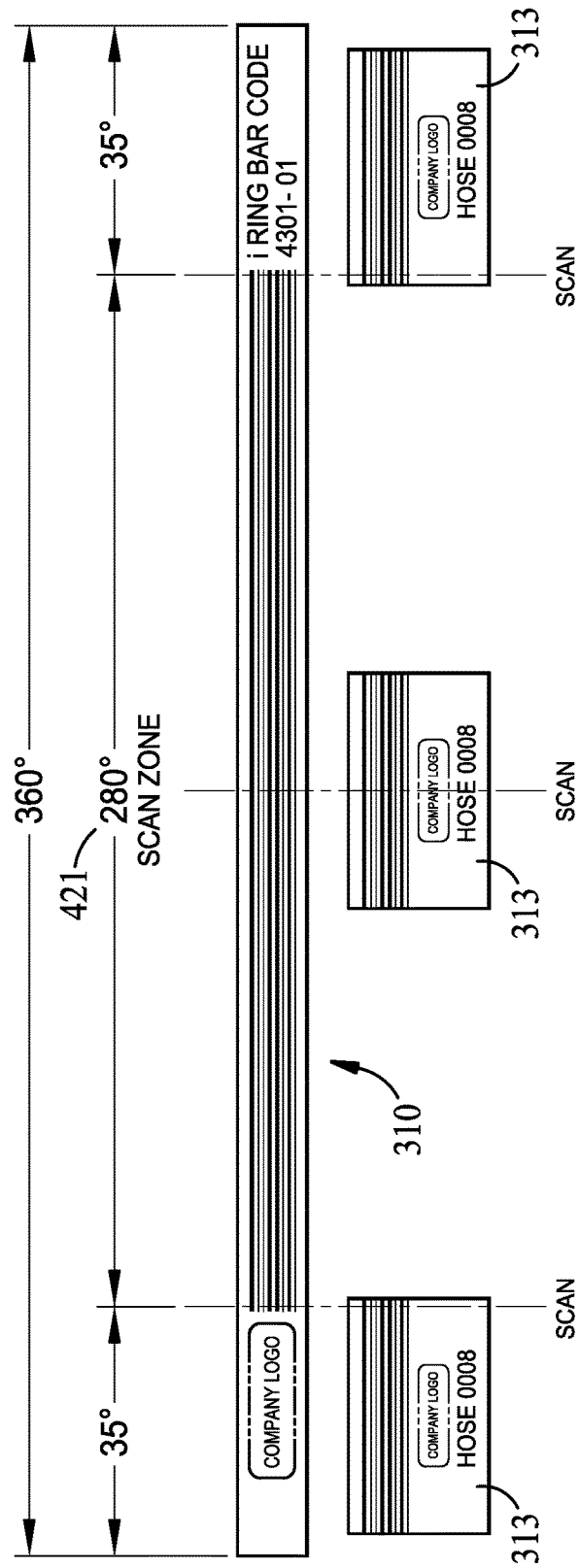
FIG. 15A is a line drawing, partly in diagram form, showing hose coupling barcode labels.

FIG. 15A shows hose coupling barcode labels 313 and a snap ring barcode label 310 with respect to scan rotation area 421.

Figure 16:
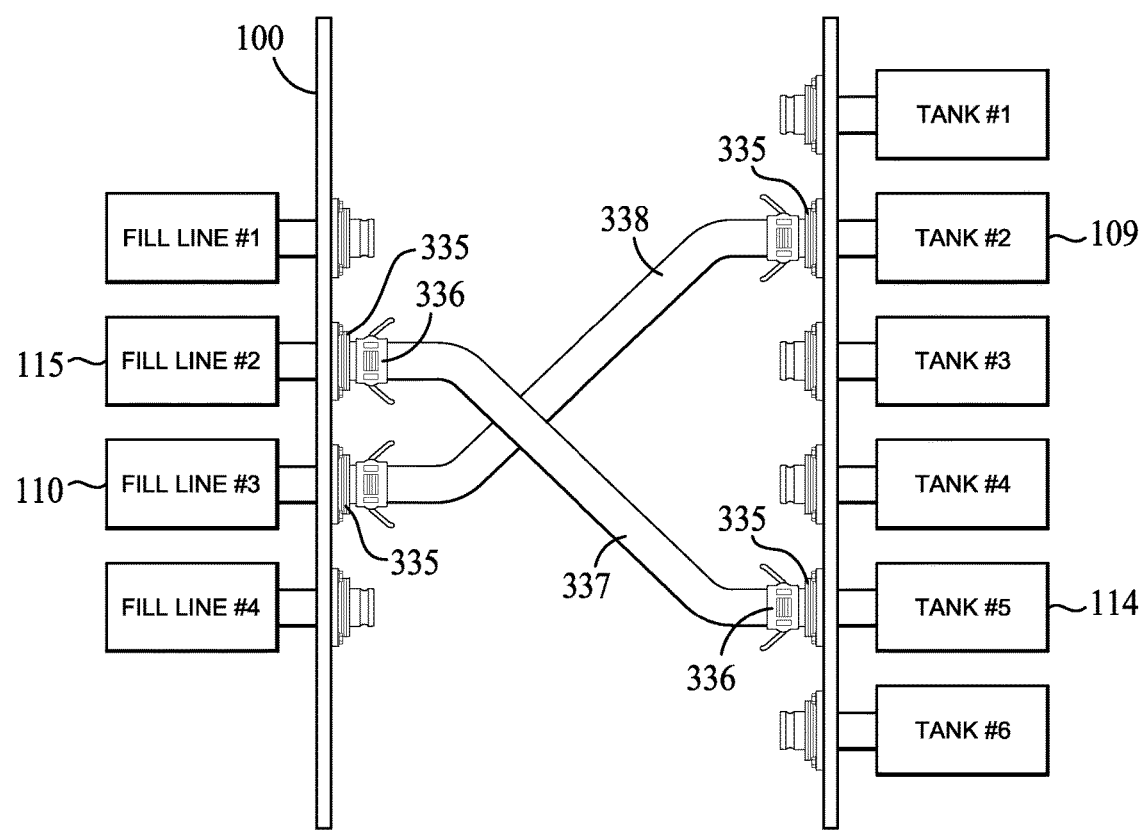
FIG. 16 is a drawing showing the intelligent hoses with its intelligent quick connect hose couplings.

FIG. 16 shows the intelligent hose 337 with its intelligent quick connect hose coupling 336 connected to an intelligent manifold port assembly 335 providing a liquid path from tank number five 114 to fill line number two 115. Also shown is an intelligent hose 338 with its intelligent quick connect hose coupling 336 connected to an intelligent manifold port assembly 335 providing a liquid path from tank number two 109 to fill line number three 110.

Figure 17:
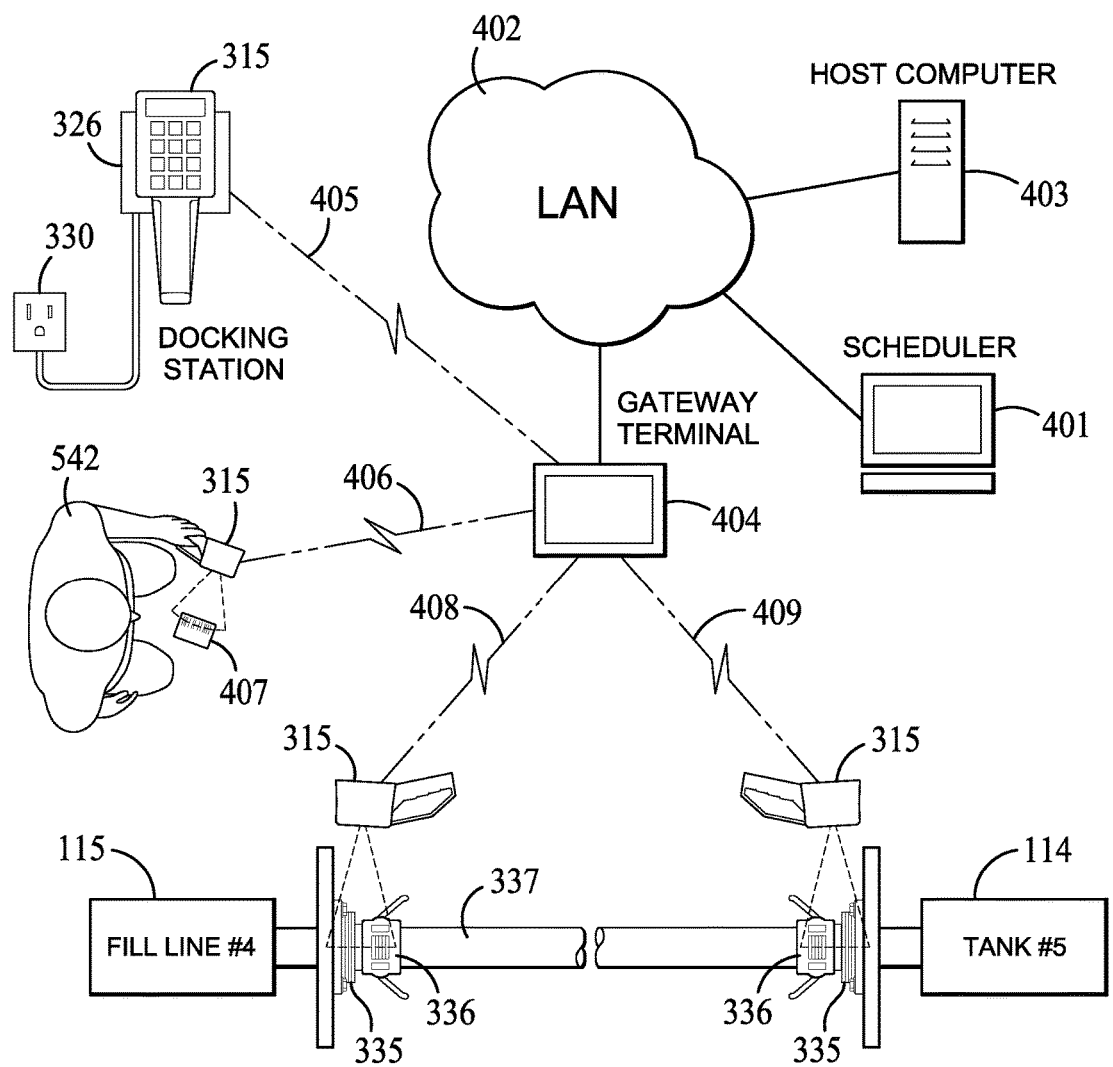
FIG. 17 is schematic diagram of an intelligent barcode scanning system.

FIG. 17 is a schematic system diagram showing a scheduler terminal 401 connected to a local area network 402, and a host computer 403 connected to the local area network 402. A gateway terminal 404 is also connected to the local area network 402. Also shown is a handheld barcode scanning terminal 315 being held by docking station 326, which is being powered by power module 330. The handheld barcode scanning terminal 315 is shown communicating to the gateway terminal 404 via the RF link 405. The handheld barcode scanning terminal 315 is being held by the hose installer 542 scanning his employee badge 407. The handheld barcode scanning terminal 315 is communicating with the gateway terminal 404 via the RF link 406.

The scheduler enters the sequence of hose removal from the previous day's operations and the hose installation required to transfer liquids from holding tanks to filling lines, for the next operation, on his terminal 401. The schedule is sent from terminal 401 by a local area network 402 to the host computer 403. The schedule is also sent via the local area network 402 to the gateway terminal 404, typically located near the hose connection room. The add/delete hose schedule is transferred via of the local RF network 405 to the barcode scanning terminal 315 cradled in the docking station 326. When the operator 542 starts the exchange of hoses, he first must send his personal barcode identification badge, which will be uploaded to the gateway terminal 404 via the RF network 406. He then will receive from the gateway terminal 404, a list of add and delete hoses. As he removes the hoses, as instructed, he scans the intelligent hose couplings and manifold ports; this event is then transmitted back to the gateway terminal 404 via the RF network 406.

If the operator removes the wrong hose, he receives an audio alert and a visual message on the barcode scanning terminal. As the operator installs the new required hoses, between intelligent tank ports and intelligent filling lines ports, he scans intelligent port and intelligent hose connector, at the same time to confirm that he is installing the correct hose on the correct port. The operator scans both ends of the hoses and their connections 335 and 336 to confirm that they were installed properly. When the correct installation is confirmed, the barcode scanning terminal 315 will transmit the status to the gateway terminal 404. As each requested connection is confirmed, a message is sent from the gateway terminal 404 to the host computer 403 via the local area network.

Also being shown is a handheld barcode scanning terminal 315 scanning a connection between intelligent hose 336 and intelligent manifold port assembly 335 which is connected to tank number five 114 and also scanning a connection between intelligent hose connector 336 and intelligent manifold port assembly 335 which is connected to fill line number two 115.

Figure 18:
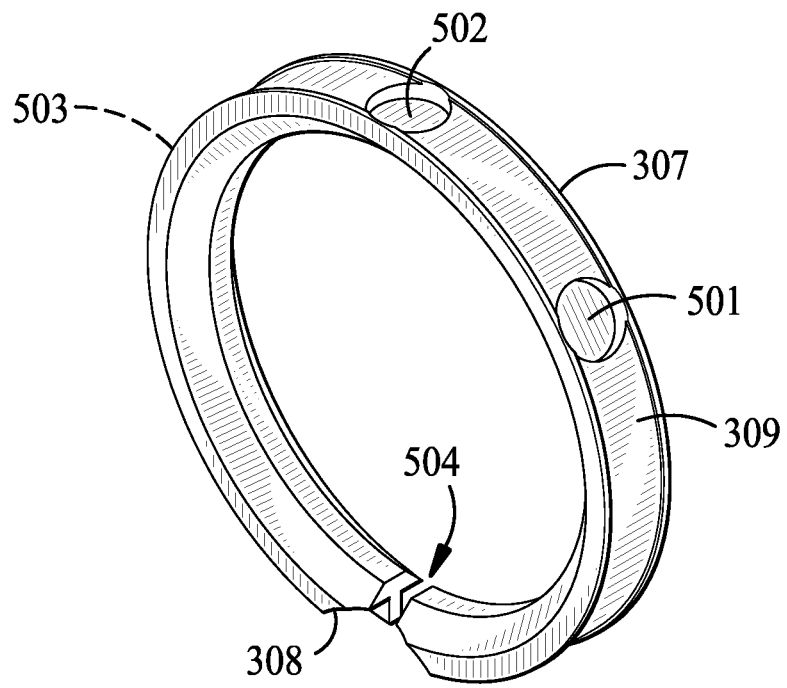
FIG. 18 is an isometric drawing of a snap ring.
Figure 18A:
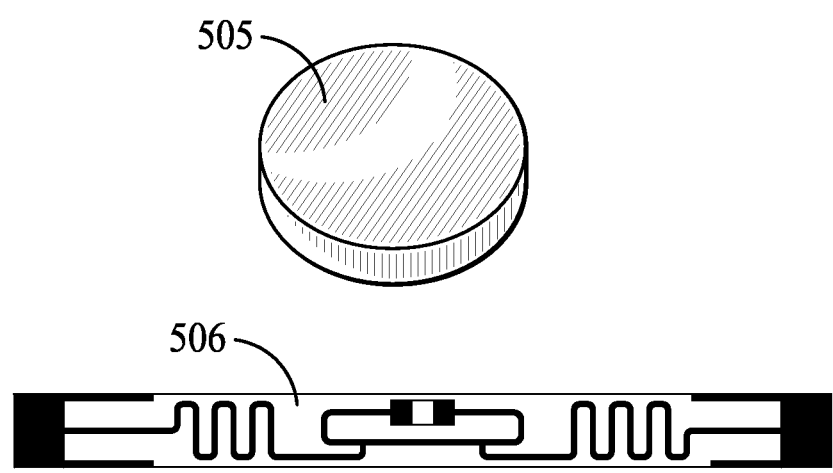
FIG. 18A is a photograph of an RFID button.
Figure 18B:
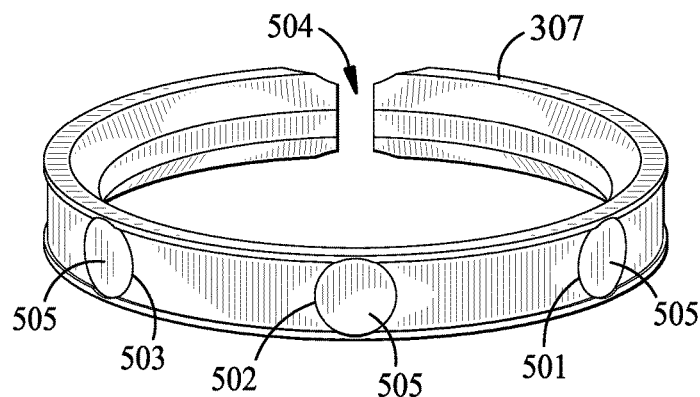
FIG. 18B is a photograph of a snap ring and an RFID button.
Figure 18C:
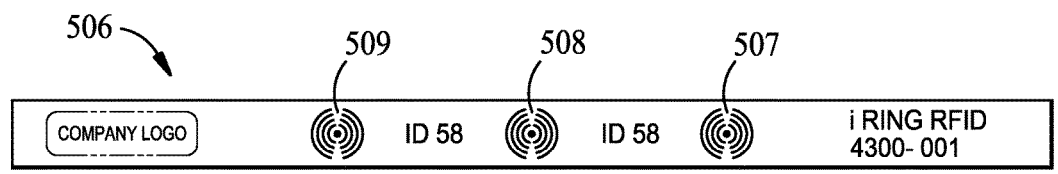
FIG. 18C is a photograph of a snap ring showing hotspots.
Figure 18D:
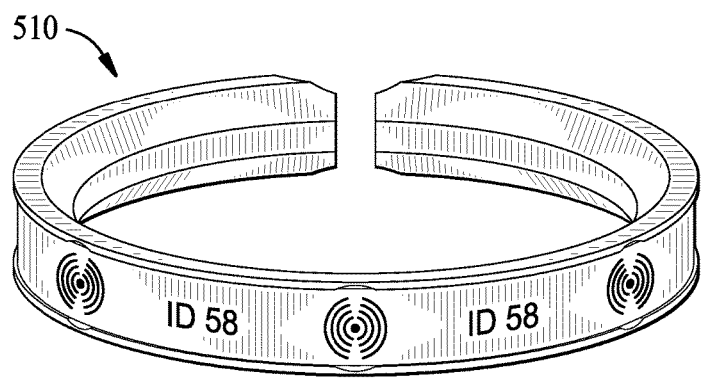
FIG. 18D is a photograph of an intelligent RFID snap ring assembly.

FIG. 18 shows a snap ring 503 with recessed label area 309, a recessed cover retaining clip area 308, and a recessed area for RFID buttons 502, 501 and not shown 503, and a split ring area 504. FIG. 18A is a photograph of an RFID button 505 and an RFID label 506. FIG. 18B is a photograph of a snap ring 307 and RFID buttons 505 inserted in recesses 501, 502, 503. FIG. 18C is a photograph of a snap ring RFID label 506 showing hotspots 507, 508, 509. FIG. 18D is a photograph of an intelligent RFID snap ring assembly 510.

Figure 19:
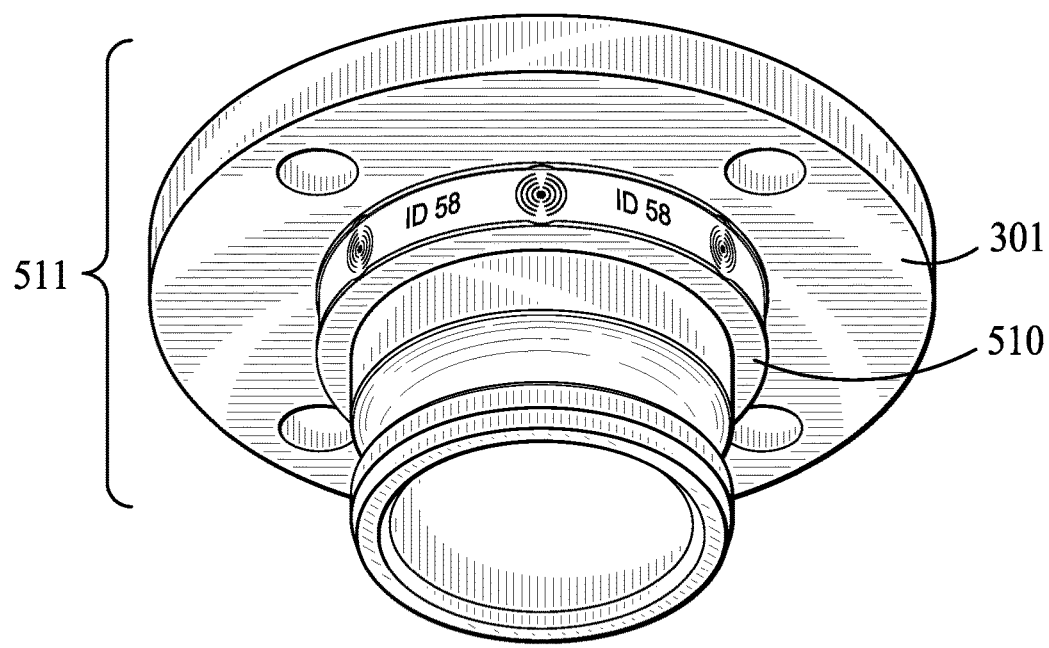
FIG. 19 is a photograph of an intelligent RFID ring attached to the quick connect manifold port.
Figure 20:
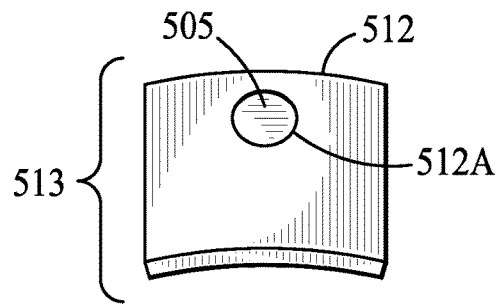
FIG. 20 is a photograph of an RFID button carrier.
Figure 20A:
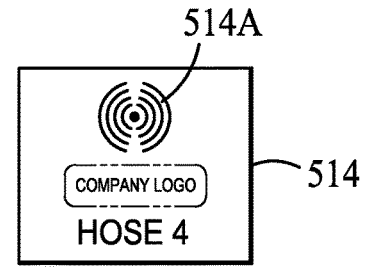
FIG. 20A is a photograph of an RFID label showing hotspots.
Figure 20B:
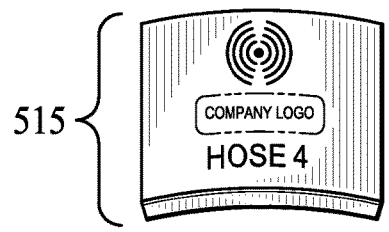
FIG. 20B is a photograph of the RFID label attached to the RFID tag assembly.
Figure 20C:
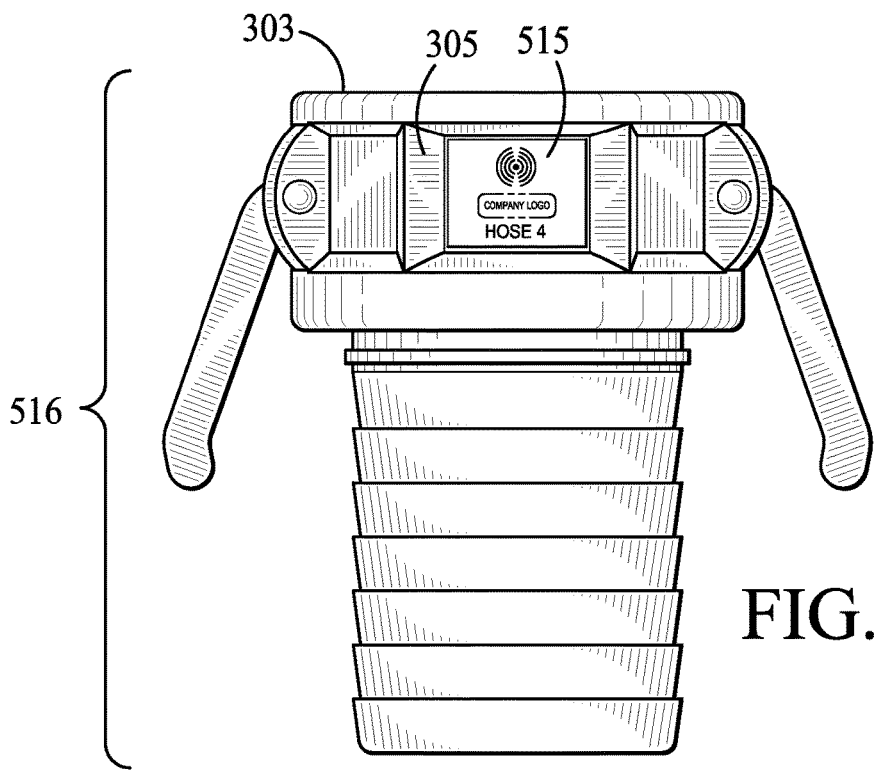
FIG. 20C is a photograph of the hose coupling with an RFID tag assembly.

With reference to FIGS. 19-20C, various RFID snap ring assembly 506 attached to a quick connect storage tank manifold ports 301 to form an intelligent manifold port assembly 511. FIG. 20 is a photograph of an RFID button carrier 512 with an RFID button 505 inserted in the recessed area 512A forming assembly 513. FIG. 20A is a photograph of a label 514, which shows the hotspot 514A on the label. FIG. 20B is a photograph of label 514 attached to the RFID assembly 513 to form the RFID tag assembly 515. FIG. 20C is a photograph of hose coupling 303 with RFID tag assembly 515 applied to recessed area 305 to form intelligent RFID quick connect hose coupling 516.

FIG. 21 is a photograph of a handheld RFID scanning terminal with RF communications 520 showing RFID antenna 521. FIG. 21A shows a handheld RFID scanning terminal 520 being held in charging station 326. FIG. 21B is an isometric drawing of charging station 326.

Figure 22:
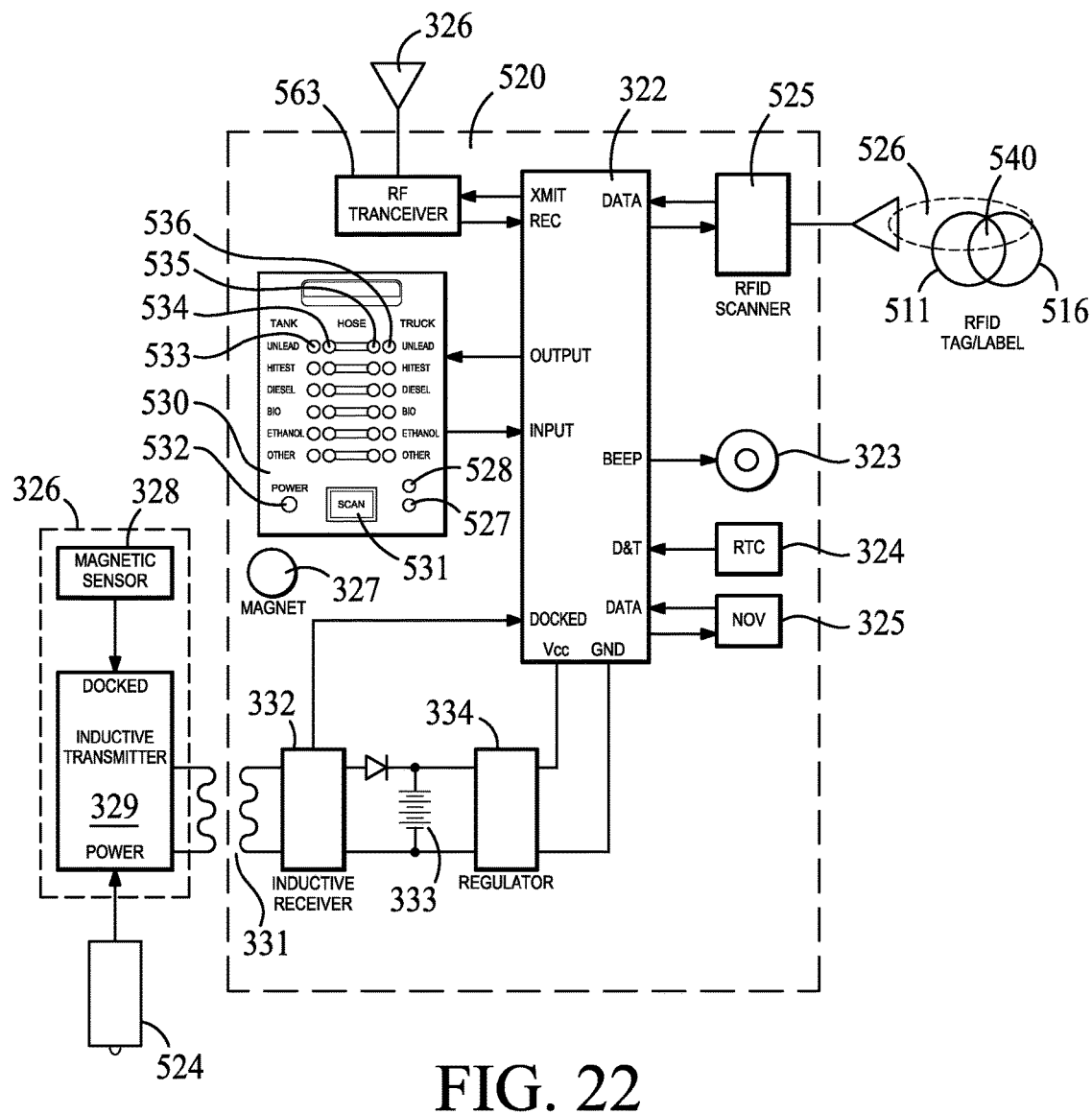
FIG. 22 is a schematic drawing of the handheld RFID scanning terminal of FIG. 21.

FIG. 22 is a schematic system diagram showing a handheld RFID scanning terminal with RF communications 520, an assembly 540, a charging cradle 326, and power module 524.

The scanning module 520 contains a microprocessor 322 that receives data from RFID scanner 525 which is transmitted to RF transceiver 563 and nonvolatile memory 325. The RF transceiver 563 and/or nonvolatile memory 325 transmit data back to the microprocessor 322 and if the data is incorrect the microprocessor sends a signal to audio enunciator 323 to alert the operator. The microprocessor 322 also sends data to display 530 to illuminate a tank product LED 533, a hose connection LED 534, a hose connection LED 535, a truck product LED 536, a delivery truck identification LED 527, or a truck driver identification LED 528. The display 530 may also illuminate power LED 532, or auxiliary LEDS 527,528 in response to the data received from the microprocessor 322 or data input by the operator through keypad 531.

The microprocessor 322 sends data to a gateway terminal (not pictured) through RF transceiver 563. The assembly 540 contains an intelligent RFID ring 511, an intelligent quick connect hose RFID label 516. The scanning module 520 receives data from the assembly 540 through RFID scanner 525, which uses RFID scanning beam 526.

The charging cradle 326 is electrically connected to power module 524 and contains magnet sensor 328, inductive transmitter 329, and inductive coils 331. When the magnet sensor 328 senses close proximity of magnet 327 in the scanning module 520, the inductive transmitter 329 is switched to an on state to transmit electricity from power module 330 to an inductive receiver 332 in the scanning module 520. This electricity is transmitted through inductive coils 331. The microprocessor 322 ultimately receives electricity from terminal battery 333 which is mounted in parallel with inductive receiver 332 and regulator 334.

Figure 23:
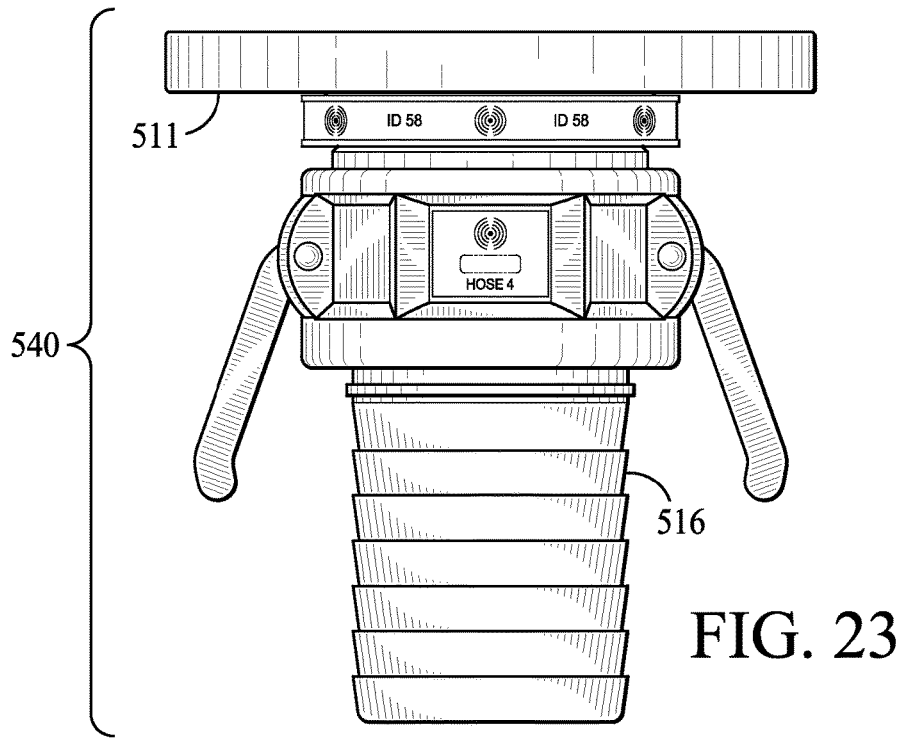
FIG. 23 is a photograph of an intelligent RFID manifold assembly and connected hose coupler.

FIG. 23 is a photograph of an intelligent RFID manifold port assembly 511 and a connected intelligent RFID quick connect hose coupling 516.

Figure 24:
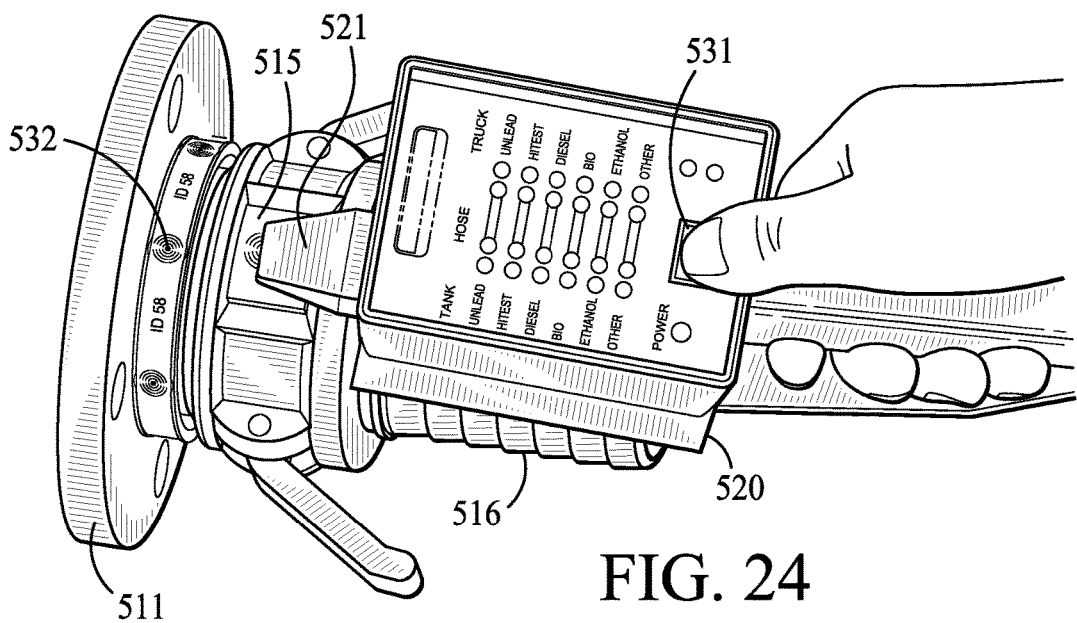
FIG. 24 is a photograph of the handheld RFID scanning terminal of FIG. 21 scanning RFID tags of the manifold assembly and hose coupler of FIG. 23.

FIG. 24 is a photograph of a handheld RFID scanning terminal 520 concurrently scanning the RFID tag 515 on an intelligent manifold port assembly 540, and a connected intelligent RFID quick connect hose coupling 516, and the operator pressing the read button 531.

Figure 25:
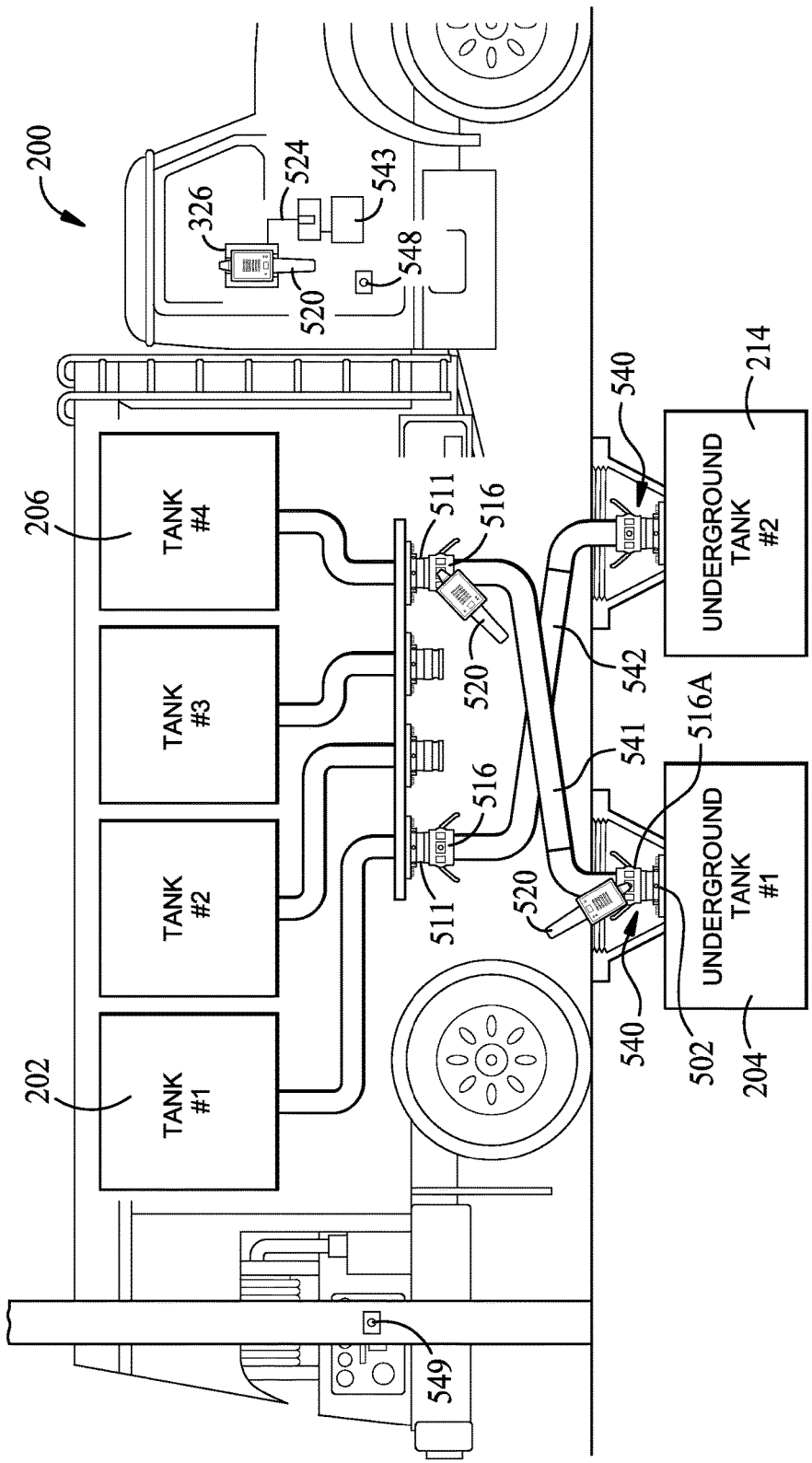
FIG. 25 is a schematic line drawing, showing intelligent hoses interconnected between a delivery truck and the underground tanks.

FIG. 25 shows the intelligent hose 542 with its intelligent quick connect hose coupling 511 connected to an intelligent manifold port assembly 516 providing a liquid path from truck tank number one 202 to underground tank number two 214. Also shown is an intelligent hose 541 with its intelligent quick connect hose coupling 516 connected to an intelligent manifold port assembly 511 providing a liquid path from tank number four 206 to underground tank number one 204. Also shown is RFID scanner 520 reading the RFID tags on the intelligent hose 541 at the connection to tank number four 206 on the delivery truck 200 and the scanning of the RFID tags on the intelligent hose 541 at the underground tank number one 204. A truck identification RFID tag 548 is attached to delivery truck 200. The RFID scanner 520 is shown in its charging cradle inside the delivery truck cab 200. The charge cradle 326 power cord 524 is plugged to communicate with the delivery truck battery 543.

Figure 25A:
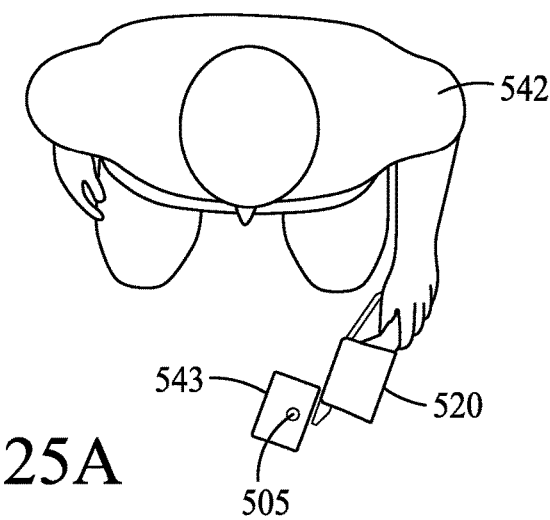
FIG. 25A is a line drawing of a representative delivery truck operator.

FIG. 25A shows a delivery truck operator 542 scanning his employee RFID tag 505 on his employee badge 543.

Figure 25B:
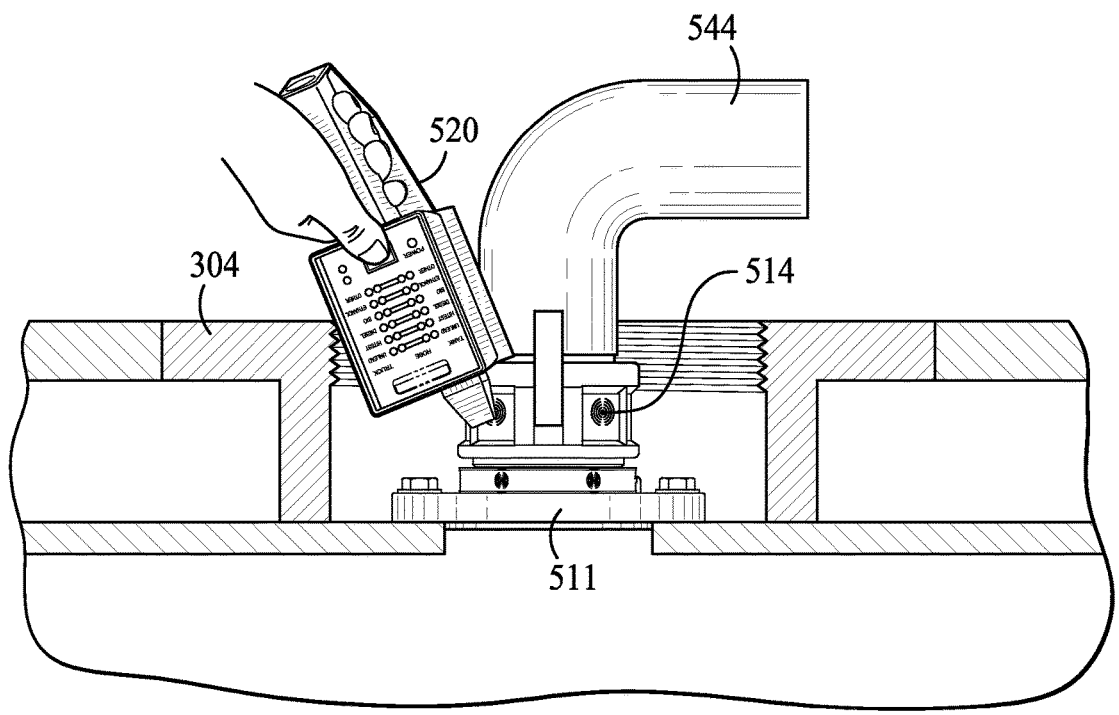
FIG. 25B is a line drawing, showing RFID scanning as employed in the system of FIG. 25.

FIG. 25B shows an RFID scanner 520 scanning an RFID tag on a right angle intelligent RFID quick connect hose coupling 544.

Figure 26:
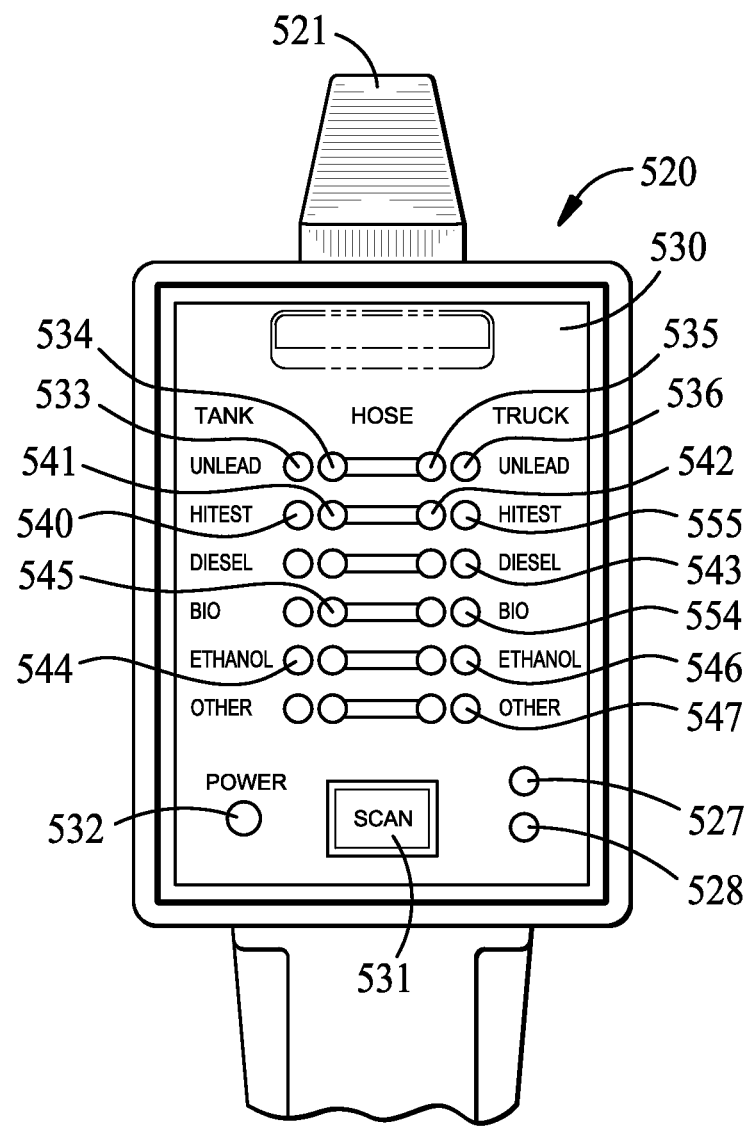
FIG. 26 is a photograph of the RFID scanner display panel for the scanner of FIG. 25B.

FIG. 26 is a photograph of an RFID scanner 520, a display panel 530 with tank product LEDs 533, 540, 544, a hose tank connection LED 534, 541, 545, a hose truck connection LED 535, 542, 543, a truck product LED 536, 546, 555, a delivery truck identification LED 527, a truck driver identification LED 528, a keypad 531, and power on the LED 532.

When a fluid delivery truck driver arrives at the delivery point, he removes the handheld RFID scanner 520 from its cradle 326 located in the cab of delivery truck 200. He first scans his personal RFID identification tag 505, located on either a fob or a badge 543, with the RFID scanner 520. This event is time stamped and stored in the nonvolatile memory in the RFID scanner. He is then instructed to scan the RFID tag 549, which identifies the location of his delivery. Again, this event is time stamped and stored in the nonvolatile memory in the RFID scanner 520.

As he connects intelligent hoses to the intelligent manifolds on the delivery truck 200, he must scan both the intelligent port 511 and the intelligent hose connection 516. This transaction is time stamped and stored in the nonvolatile memory in the scanning terminal 520. He is then instructed to scan the intelligent port 502 mounted to the underground tank 204 and the intelligent hose connection 516A. If this connection is correct, the event is time stamped and stored in the nonvolatile memory in the scanning terminal 520, and a positive audio alert will be emitted and a message to proceed to transfer liquids will be displayed on the scanning terminal 520.

When the hose is first connected to the tank 204 intelligent port and scanned with the handheld RFID scanner 520, the scanner display 536 will indicate the type of fuel in the tank. When the intelligent hose connection is scanned, it will light the orange LED 541, indicating that the intelligent hose has been identified. The operator is then instructed to scan the intelligent hose connection 516 and the intelligent tank port 511 after the connection has been made to ensure the correct product will be fed to the correct tank. If this connection is correct, the orange LEDs will turn to green indicating that it is correct connection. If the connection is incorrect, the LEDs will turn red, indicating that he has connected the intelligent hose to the wrong port.

It should be appreciated that the intelligent connection line protection system may be efficiently and easily implemented for use in properly connecting existing manifold ports and inlet lines via quick disconnect hose couplers and also for use in properly connecting fuel delivery truck outlets and underground fuel tank inlets via fuel hose adapter couplers. Precise angular orientation of the connections is not required in order to read the barcodes and/or the RFID tags. The use of the handheld scanners with communication capability allows for an immediate confirmation that a connection is correct or immediate input that the connection is incorrect. The scanner may be easily charged by a charger for the manifold port/inlet line application and may be easily charged through the electrical cigarette lighter or vehicle electric system for the fuel tank truck application. Additional information such as a time stamp for the hose connections and the identification of the installer may also be obtained through the connection line protection system.

While preferred embodiments of the foregoing connection line protection system have been set forth for purposes of illustration, the foregoing description should not be deemed a limitation of the invention. Accordingly, various modifications, adaptations and alternatives may occur to one skilled in the art without departing from the spirit and the scope of the present invention.

The invention claimed is:

1. A connection line protection system comprising: a first array of outlets each having a first unique identifier; a second array of inlets each having a second unique identifier; a connector having opposed ends each having a coupling wherein at least one coupling has a plurality of connector identifiers disposed at angularly spaced locations around said coupling;
 a scanner for reading in tandem a first identifier and a connector identifier and a second identifier and a connector identifier and comparing said readings with a schedule to determine whether the opposed ends of said connector are properly connected between an outlet and an inlets
 wherein at least one unique identifier consist of a barcode which substantially subtends around an outlet or an inlet and a snap ring which carries a unique identifier and is disposed about a said outlet or a said inlet.

2. The connection line protection system of claim 1 wherein said identifiers comprise barcodes or RFIDs.

3. The connection line protection system of claim 1 wherein said first array of outlets is a plurality of manifold ports.

4. The connection line protection system of claim 3 wherein said second array of inlets is a plurality of inlet ports.

5. The connection line protection system of claim 3 wherein said manifold ports are each connected to a storage tank.

6. The connection line protection system of claim 1 wherein said connector is a hose.

7. The connection line protection system of claim 1 wherein said outlets comprise a multiple port fuel manifold each connecting with corresponding fuel tanks of a fuel delivery truck.

8. The connection line protection system of claim 7 wherein said inlets communicate with a corresponding storage tank.

9. The connection line protection system of claim 1 wherein the connector has opposed couplings each with a ring mounting angularly spaced identifiers.

10. The connection line protection system of claim 9 wherein said identifiers comprise a barcode or an RFID.

11. The connection line protection system of claim 10 wherein at least two barcodes or at least two RFIDs are disposed at angularly spaced locations around said coupling.

12. The connection line protection system of claim 9 wherein said rings snap onto said couplings.

13. The connection line protection system of claim 1 wherein said outlets further have a plurality of angularly spaced barcodes or RFIDs.

14. The connection line protection system of claim 1 wherein said inlets further have a plurality of angularly spaced barcodes or RFIDs.

15. The connection line protection system of claim 1 wherein said scanner has a panel which schematically depicts connections between a first array of outlets and a second array of inlets.

16. The connection line protection system of claim 1 wherein said scanner emits a green light when the opposed ends of said connector are properly connected between an outlet and an inlet and emits a red light when the opposed ends of said connector are improperly connected between an outlet and an inlet.

17. A connection line protection system comprising:
 a first array of outlets each having a first unique identifier;
 a second array of inlets each having a second unique identifier;
 a connector having opposed ends each having a coupling wherein at least one coupling has a plurality of connector identifiers disposed at angularly spaced locations around said coupling;
 a scanner for reading in tandem a first identifier and a connector identifier and a second identifier and a connector identifier and comparing said readings with a schedule to determine whether the opposed ends of said connector are properly connected between an outlet and an inlet, said scanner having a panel which schematically depicts connections between a first array of outlets and a second array of inlets.

18. A connection line protection system comprising:
 a first array of outlets each having a first unique identifier;
 a second array of inlets each having a second unique identifier;
 a connector having opposed ends each having a coupling wherein at least one coupling has a plurality of connector identifiers disposed at angularly spaced locations around said coupling;
 a scanner for reading in tandem a first identifier and a connector identifier and a second identifier and a connector identifier and comparing said readings with a schedule to determine whether the opposed ends of said connector are properly connected between an outlet and an inlet, wherein said scanner emits a green light when the opposed ends of said connector are properly connected between an outlet and an inlet and emits a red light when the opposed ends of said connector are improperly connected between an outlet and an inlet.

* * * * *